United States Patent
Lee

(10) Patent No.: US 11,048,625 B2
(45) Date of Patent: Jun. 29, 2021

(54) MEMORY SYSTEM AND OPERATING METHOD THEREOF

(71) Applicant: SK hynix Inc., Gyeonggi-do (KR)

(72) Inventor: Jong-Min Lee, Seoul (KR)

(73) Assignee: SK hynix Inc., Gyeonggi-do (KR)

( * ) Notice: Subject to any disclaimer, the term of this patent is extended or adjusted under 35 U.S.C. 154(b) by 22 days.

(21) Appl. No.: 16/404,437

(22) Filed: May 6, 2019

(65) Prior Publication Data

US 2020/0097400 A1 Mar. 26, 2020

(30) Foreign Application Priority Data

Sep. 20, 2018 (KR) .................. 10-2018-0112757

(51) Int. Cl.
*G06F 12/02* (2006.01)
(52) U.S. Cl.
CPC .. *G06F 12/0253* (2013.01); *G06F 2212/1044* (2013.01)
(58) Field of Classification Search
CPC .............. G06F 12/0253; G06F 2212/1044
See application file for complete search history.

(56) References Cited

U.S. PATENT DOCUMENTS

| | | | | |
|---|---|---|---|---|
| 2008/0294814 A1* | 11/2008 | Gorobets | ............. | G11C 16/349 710/62 |
| 2011/0271030 A1* | 11/2011 | Iaculo | ................ | G06F 12/0246 711/102 |
| 2014/0181370 A1* | 6/2014 | Cohen | ................ | G06F 12/0246 711/103 |
| 2015/0332788 A1* | 11/2015 | Bellorado | ............. | G11C 29/36 714/719 |
| 2017/0109273 A1* | 4/2017 | Lee | ........................ | G06F 3/0605 |
| 2017/0249191 A1* | 8/2017 | Chang | ................... | G06F 9/5038 |
| 2017/0286213 A1* | 10/2017 | Li | ........................ | G11C 16/22 |
| 2018/0275873 A1* | 9/2018 | Frid | ..................... | G06F 12/0246 |
| 2018/0341413 A1* | 11/2018 | Lai | ......................... | G06F 3/0647 |
| 2018/0373629 A1* | 12/2018 | Kim | ........................ | G06F 3/0679 |
| 2019/0114093 A1* | 4/2019 | Roeder | ................. | G06F 3/0619 |
| 2019/0196957 A1* | 6/2019 | Byun | .................... | G06F 3/0631 |

FOREIGN PATENT DOCUMENTS

| | | |
|---|---|---|
| KR | 10-2016-0078611 | 7/2016 |
| KR | 10-2016-0110596 | 9/2016 |
| KR | 10-2016-0113580 | 9/2016 |

OTHER PUBLICATIONS

Storage Servers, A look into data deduplication feature and its advantages, Dec. 23, 2014, Storage Servers, available at: https://storageservers.wordpress.com/2014/12/23/a-look-into-data-deduplication-feature-and-its-advantages/ (Year: 2014).*

* cited by examiner

*Primary Examiner* — Ryan Bertram
(74) *Attorney, Agent, or Firm* — IP & T Group LLP

(57) ABSTRACT

A memory system includes: a memory device; a memory; a plurality of queues; a victim block manager suitable for storing garbage collection information corresponding to a victim block in the memory; a queue manager suitable for classifying the garbage collection information and the queues according to attribute and queuing the classified garbage collection information to the corresponding queues, respectively; and a garbage collection performer suitable for controlling a garbage collection operation of the memory device based on the queued garbage collection information.

20 Claims, 23 Drawing Sheets

MEMORY SYSTEM AND OPERATING METHOD THEREOF

CROSS-REFERENCE TO RELATED APPLICATIONS

The present application claims priority of Korean Patent Application No. 10-2018-0112757, filed on Sep. 20, 2018, which is incorporated herein by reference in its entirety.

BACKGROUND

1. Field

Various embodiments of the present invention relate to a memory system, and more particularly, to a memory system capable of efficiently performing a garbage collection operation, and a method for operating the memory system.

2. Description of the Related Art

The computer environment paradigm has shifted to ubiquitous computing, which enables computing systems to be used anytime and anywhere. As a result, use of portable electronic devices such as mobile phones, digital cameras, and laptop computers has rapidly increased. These portable electronic devices generally use a memory system having one or more memory devices for storing data. A memory system may be used as a main memory device or an auxiliary memory device of a portable electronic device.

Memory systems provide excellent stability, durability, high information access speed, and low power consumption since they have no moving parts, as compared with a hard disk device. Examples of memory systems having such advantages include universal serial bus (USB) memory devices, memory cards having various interfaces, and solid state drives (SSD).

SUMMARY

Embodiments of the present invention are directed to a memory system capable of efficiently performing a garbage collection operation having various attributes.

In accordance with an embodiment of the present invention, a memory system includes: a memory device; a memory; a plurality of queues; a victim block manager suitable for storing garbage collection information corresponding to a victim block in the memory; a queue manager suitable for classifying the garbage collection information and the queues according to attribute and queuing the classified garbage collection information to the corresponding queues, respectively; and a garbage collection performer suitable for controlling a garbage collection operation of the memory device based on the queued garbage collection information.

In accordance with another embodiment of the present invention, a method for operating a memory system includes: storing garbage collection information corresponding to a detected victim block in a memory; classifying the garbage collection information and a plurality of queues according to attribute and queuing the classified garbage collection information to the corresponding queues, respectively; and controlling a garbage collection operation of a memory device based on the queued garbage collection information.

In accordance with another embodiment of the present invention, a method for operating a memory system includes: detecting a victim block among a plurality of memory blocks of the memory device; generating garbage collection information corresponding to the victim block; classifying the garbage collection information and a plurality of garbage collection queues based on attribute of a garbage collection operation; queuing the classified garbage collection information to corresponding garbage collection queues, respectively; controlling the garbage collection operation performed on the memory device based on the queued garbage collection information, wherein information on the attribute respectively corresponding to the garbage collection queues are recorded in a memory in the controller, which is separate from the garbage collection queues; and wherein the garbage collection information is classified based on: whether a recovery operation is required after a sudden power-off; whether the victim block is a map block or a data block; and whether a target block is a wear-leveling target block or not.

DETAILED DESCRIPTION

Figure 1:
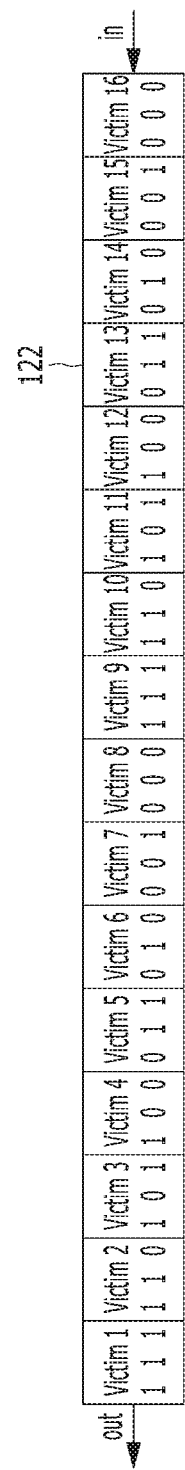
FIG. 1 is a block diagram illustrating a conventional garbage collection queue.

Various embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

It is noted that reference to "an embodiment," "another embodiment" or the like does not necessarily mean only one embodiment, and different references to any such phrase are not necessarily to the same embodiment(s).

It will be understood that, although the terms "first" and/or "second" may be used herein to describe various elements, these elements should not be limited by these terms. These terms are only used to distinguish one element, from another element. For instance, a first element discussed below could be termed a second element without departing from the teachings of the present disclosure. Similarly, the second element could also be termed the first element.

It will be understood that when an element is referred to as being "coupled" or "connected" to another element, it can be directly coupled or connected to the other element or intervening elements may be present therebetween. In contrast, it should be understood that when an element is referred to as being "directly coupled" or "directly connected" to another element, there are no intervening elements present. Other expressions that explain the relationship between elements, such as "between", "directly between", "adjacent to" or "directly adjacent to" should be construed in the same way.

The terminology used herein is for the purpose of describing particular embodiments only and is not intended to be limiting. In the present disclosure, the singular forms are intended to include the plural forms as well, unless the context clearly indicates otherwise. The articles 'a' and 'an' as used in this application and the appended claims should generally be construed to mean 'one or more' unless specified otherwise or clear from context to be directed to a singular form. It will be further understood that the terms "comprise", "include", "have", etc. when used in this specification, specify the presence of stated features, numbers, steps, operations, elements, components, and/or combinations of them but do not preclude the presence or addition of one or more other features, numbers, steps, operations, elements, components, and/or combinations thereof.

The above-described embodiments are merely for the purpose of understanding the technical spirit of the present disclosure and the scope of the present disclosure should not be limited to the above-described embodiments. It will be obvious to those skilled in the art to which the present disclosure pertains that other modifications based on the technical spirit of the present disclosure may be made in addition to the above-described embodiments.

Unless otherwise defined, all terms including technical and scientific terms used herein have the same meaning as commonly understood by one of ordinary skill in the art to which the present disclosure belongs. Unless otherwise defined in the present disclosure, the terms should not be construed as being ideal or excessively formal.

Hereinafter, the various embodiments of the present invention will be described in detail with reference to the attached drawings.

The garbage collection operation may refer to an operation of copying a valid data of a victim block into a target block. In general, a flash memory may detect a memory block including a plurality of invalid pages the number of which is equal to or greater than a predetermined threshold value as a victim block in order to prevent a memory space from being wasted, and perform a garbage collection operation onto the victim block. The flash memory may perform an erase operation on the victim block after performing the garbage collection operation of copying the valid page included in the victim block into the target block. The flash memory may attain the memory space by converting the invalidated page into an empty page through the garbage collection operation.

There may be various garbage collection operations according to the attributes. For example, the garbage collection operation may be a garbage collection operation in which the victim block is a map block or a garbage collection operation in which the victim block is a data block according to the type of the victim block. The map block is a block for storing map data, and the data block is a block for storing host data or system data.

Also, the garbage collection operation may include a wear-leveling garbage collection operation and a normal garbage collection operation according to the type of a target block. The wear-leveling garbage collection operation may be a garbage collection operation of copying cold data of a victim block into the target block when the erase count of a target block is equal to or greater than a predetermined threshold value. The normal garbage collection operation may be a garbage collection operation of copying valid data of a victim block into a target block in order to convert the invalidated page into an empty page, as described above, regardless of the erase count of the target block.

The garbage collection operation may be a recovery garbage collection operation or a non-recovery garbage collection operation according to whether a recovery operation is performed or not when the garbage collection information stored in a volatile memory gets lost due to the occurrence of a particular event, such as sudden power-off. The recovery garbage collection operation may include a read reclaim garbage collection operation and a bad block garbage collection operation. The read reclaim garbage collection operation may be a garbage collection operation in which a valid data of a victim block whose read count is equal to or greater than a predetermined threshold is copied into a target block in order to prevent a read disturbance phenomenon that may occur when a read operation is frequently performed in a particular memory block. Also, the bad block garbage collection operation may be a garbage collection operation in which, when a program failure occurs while programming data into a certain block, a valid data normally programmed in a victim block where the program failure occurs until the program failure occurs is copied into a target block.

The flash memory may queue the garbage collection information including the address information of the victim block and the target block as well as attribute information which is information on the attribute of the garbage collection operation, to queues in the controller, and sequentially perform the garbage collection operation based on the queued garbage collection information. Conventionally, the garbage collection information may be queued to a single queue, and the attribute information may be individually recorded for each garbage collection information. Therefore, when the garbage collection operation has diverse attributes and many victim blocks, the memory space occupied by the attribute information may increase.

FIG. 1 is a block diagram illustrating a conventional garbage collection queue.

It may be assumed in FIG. 1 that a garbage collection queue 122 queues first to 16$^{th}$ garbage collection information and the garbage collection information has three kinds of attributes. The attributes of the garbage collection information may include whether or not a recovery operation is performed after a sudden power-off, the type of a victim block, and the type of a target block.

The garbage collection information may include 3-bit attribute information. The most significant bit (MSB) of the attribute information may represent whether or not a recovery operation is performed after a sudden power-off, the central significant bit (CSB) may represent the type of a victim block, and the least significant bit (LSB) may represent the type of a target block.

The flash memory may record a value of "1" in the most significant bit (MSB) when a recovery operation is required after a sudden power-off, and record a value of '0' in the most significant bit (MSB) when a recovery operation is not required after a sudden power-off. Also, the flash memory may record a value of '1' in the central significant bit (CSB) when the victim block is a data block, and record a value of '0' in the central significant bit (CSB) when the victim block is a map block. Also, when the target block is a wear-leveling target block, the flash memory may record a value of '1' in the least significant bit (LSB) and, when the target block is not a wear-leveling target block, the flash memory may record a value of '0' in the least significant bit (LSB).

Since the attribute information is individually recorded for each garbage collection information, the flash memory may record the attribute information in each of the first to 16$^{th}$ garbage collection information, and queue the first to 16$^{th}$ garbage collection information to the garbage collection queue 122. Therefore, the flash memory may require 48 bits, which is obtained by multiplying 3 bits, which is allocated to the attribute information, by 16, which is the number of garbage collection information, in order to record the attribute information in the first to 16$^{th}$ garbage collection information.

Figure 2:
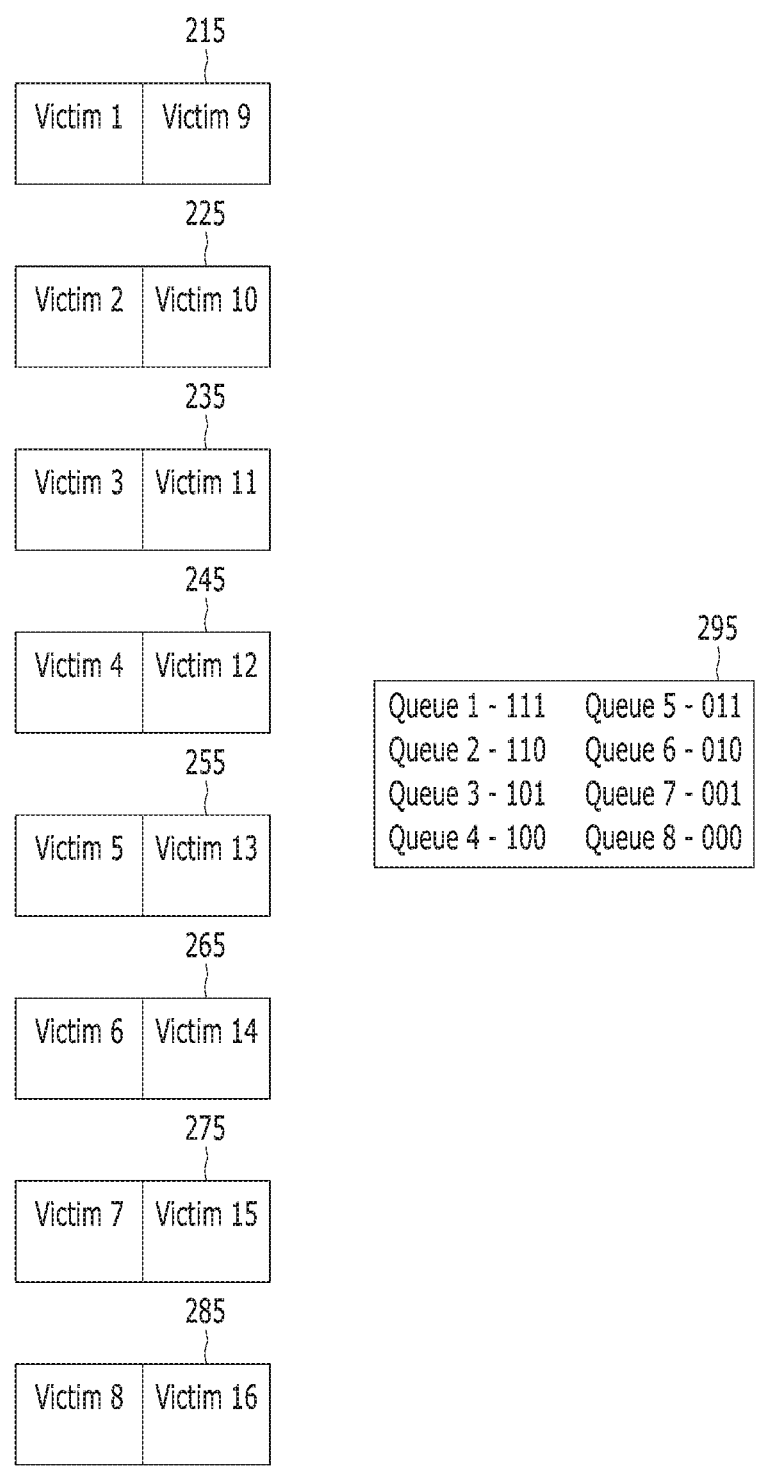
FIG. 2 is a block diagram illustrating a garbage collection queue in accordance with an embodiment of the present invention.

FIG. 2 is a block diagram illustrating a garbage collection queue in accordance with an embodiment of the present invention.

As described before with reference to FIG. 1, it may be assumed and described in this particular embodiment of the present invention that the garbage collection information has three kinds of attributes, and the total number of garbage collection information that may be queued by a plurality of garbage collection queues is 16.

In accordance with an embodiment of the present invention, a controller (described later in FIG. 3) may include as many garbage collection queues 215 to 285 as the number of all cases that may exist according to the attribute information. For example, when the garbage collection information has three kinds of attributes, the controller may classify the garbage collection information into eight (=2$^3$) cases according to the 3-bit attribute information, and the controller may include eight garbage collection queues 215 to 285 that respectively correspond to the garbage collection information of the eight cases classified based on the three kinds of attribute information.

The controller may record the attribute information respectively corresponding to the garbage collection queues 215 to 285 in a separate memory 295 and queue the garbage collection information corresponding to the attribute information to corresponding garbage collection queues. The controller may include the separate memory 295 and the separate memory 295 may be volatile memory. For example, the controller may queue the first and the ninth garbage collection information corresponding to the case representing that a recovery operation is required after a sudden power-off, the victim block is a data block, and the target block is a wear-leveling target block in the first garbage collection queue 215 by recording '111' in the separate memory 295 as the attribute information corresponding to the first garbage collection queue 215.

The controller may classify the first to 16$^{th}$ garbage collection information according to the attribute, and queue the classified garbage collection information to the garbage collection queue corresponding to the attribute. According to an embodiment of the present invention, the attribute information may be recorded in a garbage collection queue, and the garbage collection information corresponding to the attribute may be queued to a corresponding garbage collection queue. Therefore, in order to classify the first to 16$^{th}$ garbage collection information according to the attribute, a total of 24 bits obtained by multiplying 3 bits, which is allocated to the attribute information, by 8, which is the number of the garbage collection queues may be required. According to an embodiment of the present invention, since the attribution information may be recorded in the queues classified according to the attribute information without separately recording attribute information for each garbage collection information, the memory space required for allocating the attributes to garbage collection information may be reduced.

Figure 3:
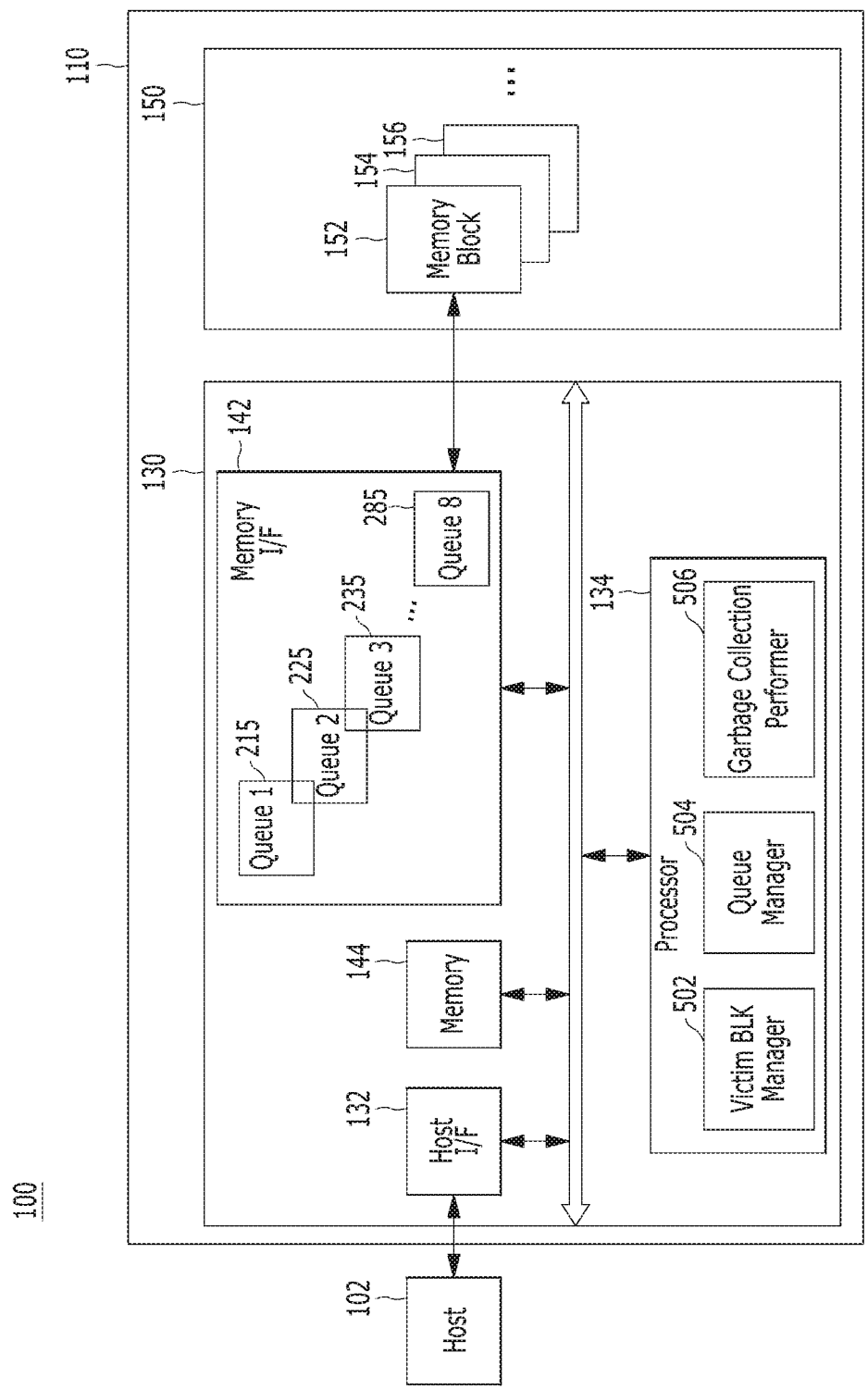
FIG. 3 is a block diagram illustrating a data processing system including a memory system in accordance with an embodiment of the present invention.

FIG. 3 is a block diagram illustrating a data processing system 100 including a memory system 110 in accordance with an embodiment of the present invention.

Referring to FIG. 3, the data processing system 100 may include the memory system 110 and a host 102 operatively coupled to the memory system 110.

The host 102 may include any of a variety of portable electronic devices such as a mobile phone, an MP3 player and a laptop computer, or any of a variety of non-portable electronic devices such as a desktop computer, a game machine, a TV and a projector.

The host 102 may include at least one OS (operating system) or a plurality of operating systems. The host 102 may execute an OS to perform an operation corresponding to a user's request on the memory system 110. Here, the host 102 may provide a plurality of commands corresponding to a user's request to the memory system 110. Thus, the memory system 110 may perform certain operations corresponding to the plurality of commands, that is, corresponding to the user's request. The OS may manage and control overall functions and operations of the host 102. The OS may support an operation between the host 102 and a user using the data processing system 100 or the memory system 110.

The memory system 110 may operate or perform a specific function or operation in response to a request from the host 102 and, particularly, may store data to be accessed by the host 102. The memory system 110 may be used as a main memory system or an auxiliary memory system of the host 102. The memory system 110 may be implemented with any one of various types of storage devices, which may be electrically coupled with the host 102, according to a protocol of a host interface. Non-limiting examples of the memory system 110 include a solid state drive (SSD), a multi-media card (MMC) and an embedded MMC (eMMC).

The memory system 110 may include various types of storage devices. Non-limiting examples of such storage devices include volatile memory devices such as a DRAM dynamic random access memory (DRAM) and a static RAM (SRAM) and nonvolatile memory devices such as a read only memory (ROM), a mask ROM (MROM), a programmable ROM (PROM), an erasable programmable ROM (EPROM), an electrically erasable programmable ROM (EEPROM), a ferroelectric RAM (FeRAM), a phase-change RAM (PCRAM), a magneto-resistive RAM (MRAM), a resistive RAM (ReRAM), and a flash memory.

The memory system 110 may include a memory device 150 and a controller 130.

The controller 130 and the memory device 150 may be integrated into a single semiconductor device, which may be included in any of the various types of memory systems as described above. For example, the controller 130 and the memory device 150 may be integrated as a single semiconductor device to constitute an SSD, a PCMCIA (personal computer memory card international association) card, SD card including a mini-SD, a micro-SD and a SDHC, and an UFS device. The memory system 110 may be configured as a part of a computer, a smart phone, a portable game player, or one of various components configuring a computing system.

The memory device 150 may be a nonvolatile memory device which may retain stored data even though power is not supplied. The memory device 150 may store data provided from the host 102 through a write operation, and output data stored therein to the host 102 through a read operation. In an embodiment, the memory device 150 may include a plurality of memory dies (not shown), and each memory die may include a plurality of planes (not shown). Each plane may include a plurality of memory blocks 152 to 156, each of which may include a plurality of pages, each of which may include a plurality of memory cells coupled to a word line. In an embodiment, the memory device 150 may be a flash memory having a 3-dimensional (3D) stack structure.

Herein, the structure of the memory device 150 and the 3D stereoscopic stack structure of the memory device 150 will be described in detail with reference to FIGS. 13 to 15 below.

The controller 130 may control the memory device 150 in response to a request from the host 102. For example, the controller 130 may provide data read from the memory device 150 to the host 102, and store data provided from the host 102 into the memory device 150. For this operation, the controller 130 may control read, write, program and erase operations of the memory device 150.

Figure 5:
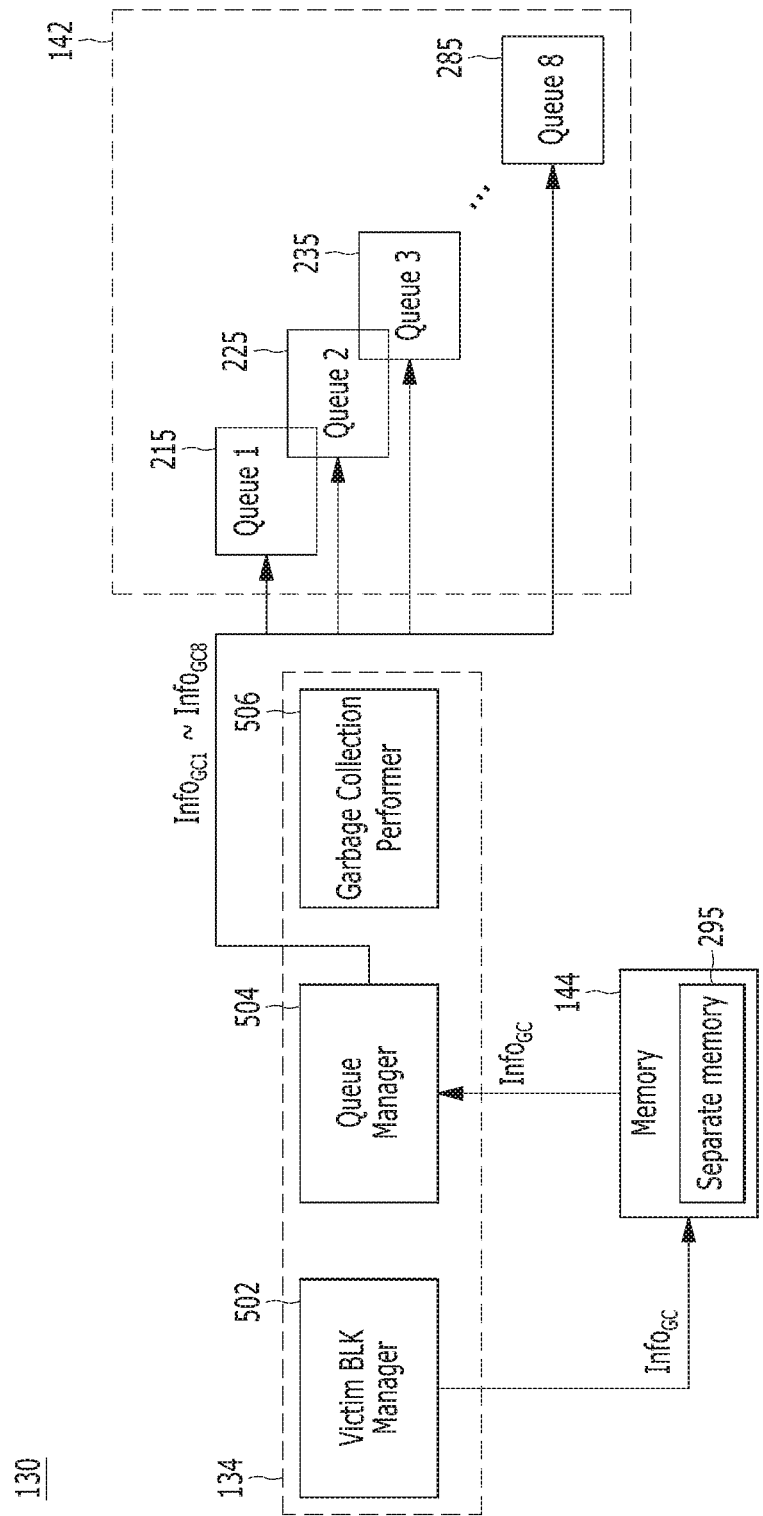
FIG. 5 is a block diagram illustrating the memory system in accordance with an embodiment of the present invention.

To be specific, the controller 130 may include a host interface (Host I/F) 132, a processor 134, a memory interface (I/F) 1.42, and a memory 144. Referring to FIG. 5, the processor 134 may include a victim block (victim BLK) manager 502, a queue manager 504, and a garbage collection performer 506. The memory interface 142 may also include the first to eighth garbage collection queues 215 to 285 as was shown in FIG. 2. The memory 144 may include the separate memory 295 as was shown in FIG. 2.

The host interface 132 may process a command and data of the host 102. The host interface 132 may communicate with the host 102 through one or more of various interface protocols such as universal serial bus (USB), multi-media card (MMC), peripheral component interconnect-express (PCI-E), small computer system interface (SCSI), serial-attached SCSI (SAS), serial advanced technology attachment (SATA), parallel advanced technology attachment (PATA), enhanced small disk interface (ESDI) and integrated drive electronics (IDE). The host interface 132 may be driven via a firmware, that is, a host interface layer (HIL) for exchanging data with the host 102.

The memory interface 142 may serve as a memory/storage interface between the controller 130 and the memory device 150 such that the controller 130 may control the memory device 150 in response to a request from the host 102.

The memory 144 may serve as a working memory of the memory system 110 and the controller 130, and store data for driving the memory system 110 and the controller 130.

The memory 144 may be a volatile memory. For example, the memory 144 may be a static random access memory (SRAM) or dynamic random access memory (DRAM). The memory 144 may be disposed within or external to the controller 130. FIG. 3 shows the memory 144 disposed within the controller 130. In an embodiment, the memory 144 may be an external volatile memory having a memory interface for transferring data between the memory 144 and the controller 130.

As described above, the memory 144 may include a program memory, a data memory, a write buffer/cache, a read buffer/cache, a data buffer/cache and a map buffer/cache to store some data required to perform data write and read operations between the host 102 and the memory device 150 and other data required for the controller 130 and the memory device 150 to perform these operations.

The processor 134 may control overall operations of the memory system 110. The processor 134 may use firmware to control the overall operations of the memory system 110. The firmware may be referred to as flash translation layer (FTL). The processor 134 may be implemented with a microprocessor, a central processing unit (CPU), or the like.

For example, the controller 130 may perform an operation requested by the host 102 in the memory device 150 through the processor 134. Also, the controller 130 may perform a background operation on the memory device 150 through the processor 134. The background operation performed on the memory device 150 may include an operation of copying and processing data stored in some memory blocks among the memory blocks 152 to 156 of the memory device 150 into other memory blocks, i.e., a garbage collection (GC) operation. The background operation may include an operation of performing swapping between the memory blocks 152 to 156 or between the data of the memory blocks 152 to 156, i.e., a wear-leveling (WL) operation. The background operation may include an operation of storing the map data stored in the controller 130 in the memory blocks 152 to 156, i.e., a map flush operation. The background operation may include an operation of detecting and processing bad blocks among the memory blocks 152 to 156 in the memory device 150, i.e., a bad block management operation.

Figure 4:
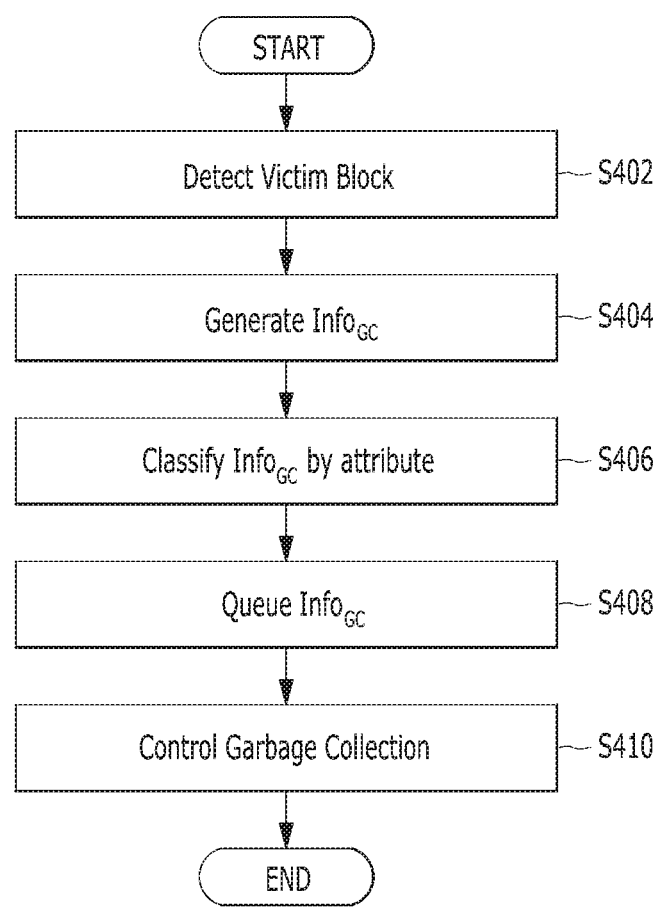
FIG. 4 is a flowchart describing a process of operating a memory system in accordance with an embodiment of the present invention.

FIG. 4 is a flowchart describing a process of operating the memory system 110 in accordance with an embodiment of the present invention.

In step S402, the processor 134 may detect a victim block based on the number of valid pages, the number of read operations performed (which may be also referred to as a "read count"), the number of erase operations performed (which may be also referred to as an "erase count"), and program failure information. The processor 134 may detect a block whose number of valid pages is equal to or greater than a predetermined threshold value, a block whose read count is equal to or greater than a predetermined threshold value, a block whose erase count is less than a predetermined threshold value, and a block where a program failure occurs as victim blocks.

In step S404, the processor 134 may generate garbage collection information $info_{GC}$ for the victim block detected in the step S402 and store the generated garbage collection information $info_{GC}$ in the memory 144. The garbage collection information $info_{GC}$ may include address information of the victim block and address information of a target block. The target block may be a block for programming the valid data of the victim block through a garbage collection operation.

In step S406, the processor 134 may read the garbage collection information $info_{GC}$ generated in the step S404 from the memory 144 to classify according to the attribute. According to an embodiment of the present invention, the attribute may include whether or not a recovery operation is performed after a sudden power-off, the type of the victim block, and the type of the target block, and the processor 134 may classify the garbage collection information $info_{GC}$ into eight cases according to the attribute. For example, the processor 134 may classify garbage collection information $info_{GC}$ in which a recovery operation needs to be performed after a sudden power-off, and the victim block is a data block, and the target block is a wear-leveling target block as a first group. Also, the processor 134 may classify garbage collection information $info_{GC}$ in which a recovery operation is not required after a sudden power-off, and the victim block is a map block, and the target block is not a wear-leveling target block as an eighth group.

In step S408, the processor 134 may queue the first to eighth garbage collection information $info_{GC}$ classified according to the attribute in the step S406 to the first to eighth garbage collection queues 215 to 285. According to an embodiment of the present invention, the processor 134 may record attribute information corresponding to each of the first to eighth garbage collection queues 215 to 285.

In step S410, the processor 134 may control the garbage collection operation of the memory device 150 based on the garbage collection information $info_{GC}$ queued in the step S408. According to an embodiment of the present invention, the processor 134 may delete the garbage collection information $info_{GC}$ from the garbage collection queue when all the valid pages of the victim block are copied into the target block based on the garbage collection information $info_{GC}$. When the garbage collection operation is required to be stopped while all the valid pages of the victim block are not copied into the target block yet during the garbage collection operation, the processor 134 may record the address of the valid page of the victim block where the garbage collection operation is performed into another memory. The processor 134 may refer to the recorded address of the valid page of the victim block to resume the garbage collection operation from the valid page where the garbage collection operation is interrupted.

FIG. 5 is a block diagram illustrating the memory system 110 in accordance with an embodiment of the present invention. FIG. 5 schematically shows only the constituent elements related to the data processing system 100 of FIG. 3.

As described earlier with reference to FIG. 3, the processor 134 may include the victim block manager 502, the queue manager 504, and the garbage collection performer 506. Also, the memory interface 142 may include the first to eighth garbage collection queues 215 to 285. The queue manager 504 may include a sudden power-off (SPO) manager 602, a victim block type manager 802, a target block type manager 1002, and a distributer 1202, which is to be described later in this description.

The victim block manager 502 may detect a victim block and store the garbage collection information $info_{GC}$ for the victim block in the memory 144. The garbage collection information $info_{GC}$ may include address information of the victim block and address information of a target block. The victim block manager 502 may select one among a block whose number of valid pages is less than a predetermined threshold value, a block whose read count is equal to or greater than a predetermined threshold value, and a block whose erase count is less than a predetermined threshold value, as the victim block.

Figure 6:
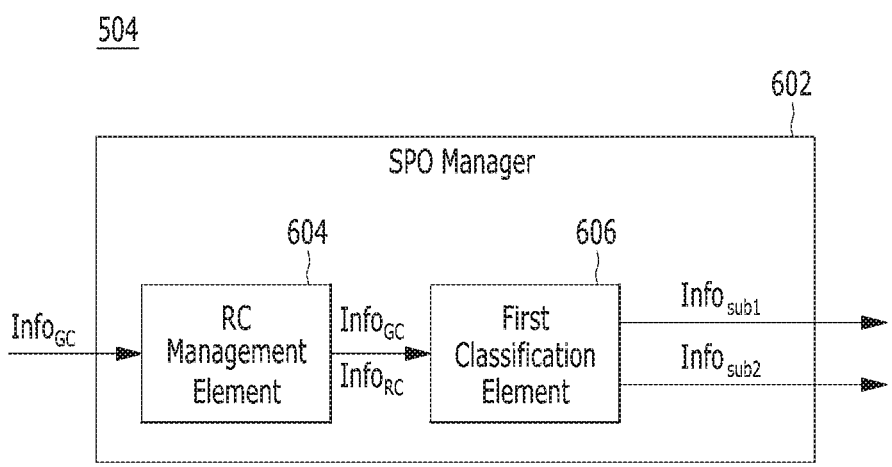
FIG. 6 is a detailed block diagram of a sudden power-off manager.
Figure 8:
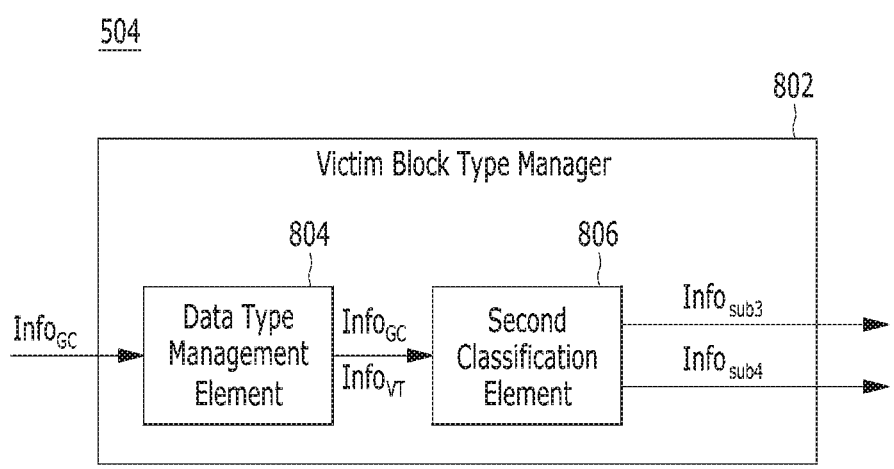
FIG. 8 is a detailed block diagram of a victim block type manager.
Figure 10:
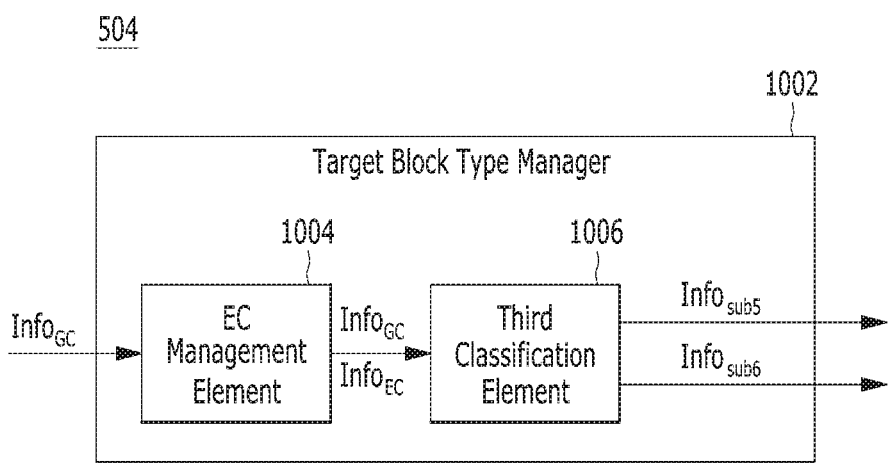
FIG. 10 is a detailed block diagram of a target block type manager.

The queue manager 504 may classify the garbage collection information $info_{GC}$ stored in the memory 144 according to the attribute. According to an embodiment of the present invention, the attribute may include whether or not a recovery operation is performed after a sudden power-off, the type of the victim block, and the type of the target block. Referring to FIGS. 6, 8 and 10, the queue manager 504 may classify the garbage collection information $info_{GC}$ into the first to sixth sub-groups according to whether or not a recovery operation is performed after a sudden power-off, the type of the victim block, and the type of the target block. As will be described later with reference to FIG. 12, the queue manager 504 may classify garbage collection information $info_{GC}$ into first to eighth groups by removing overlapping garbage collection information $info_{GC}$ from the above-classified first to sixth sub-groups, and queue them to the garbage collection queues corresponding to the groups.

FIG. 6 is a detailed block diagram of the sudden power-off manager 602 of the queue manager 504 shown in FIG. 5.

According to an embodiment of the present invention, the sudden power-off manager 602 may include a read count management element 604 and a first classification element 606.

The read count management element 604 may measure the read count of the victim block based on the garbage collection information $info_{GC}$ stored in the memory 144. The read count management element 604 may provide the first classification element 606 with the garbage collection information $info_{GC}$ and the read count information $info_{RC}$ measured for each victim block.

The first classification element 606 may classify the garbage collection information $info_{GC}$ into the first and second sub-groups based on the provided read count information $info_{RC}$. The first classification element 606 may classify garbage collection information $info_{GC}$ in which the read count of a victim block is equal to or greater than a predetermined threshold value as the first sub-group $Info_{sub1}$ among garbage collection information $info_{GC}$. The first classification element 606 may classify the garbage collection information $info_{GC}$ in which the read count of a victim block is less than the predetermined threshold value as the second sub-group among the garbage collection information $info_{GC}$. The first classification element 606 may provide the distributor 1202 (not shown) with information $info_{sub1}$ and $info_{sub2}$ about the first and second sub-groups.

According to an embodiment of the present invention, the sudden power-off manager 602 may classify garbage collection information $info_{GC}$ for victim blocks whose read count is equal to or greater than the threshold value as garbage collection information $info_{GC}$ requiring a recovery operation after a sudden power-off. When the garbage collection information is queued to a garbage collection queue, the read count of the victim block may be initialized. Therefore, when the read reclaim garbage collection operation is not performed due to the occurrence of a sudden power-off although the garbage collection information is queued to the garbage collection queue, it is impossible to detect a physically damaged read reclaim target block unless the recovery operation is performed. Therefore, the sudden power-off manager 602 may classify the garbage collection information $\text{info}_{GC}$ for a victim block whose read count is equal to or greater than a predetermined threshold value as the first sub-group, and when a sudden power-off occurs, perform a recovery operation for the first sub-group.

Figure 7:
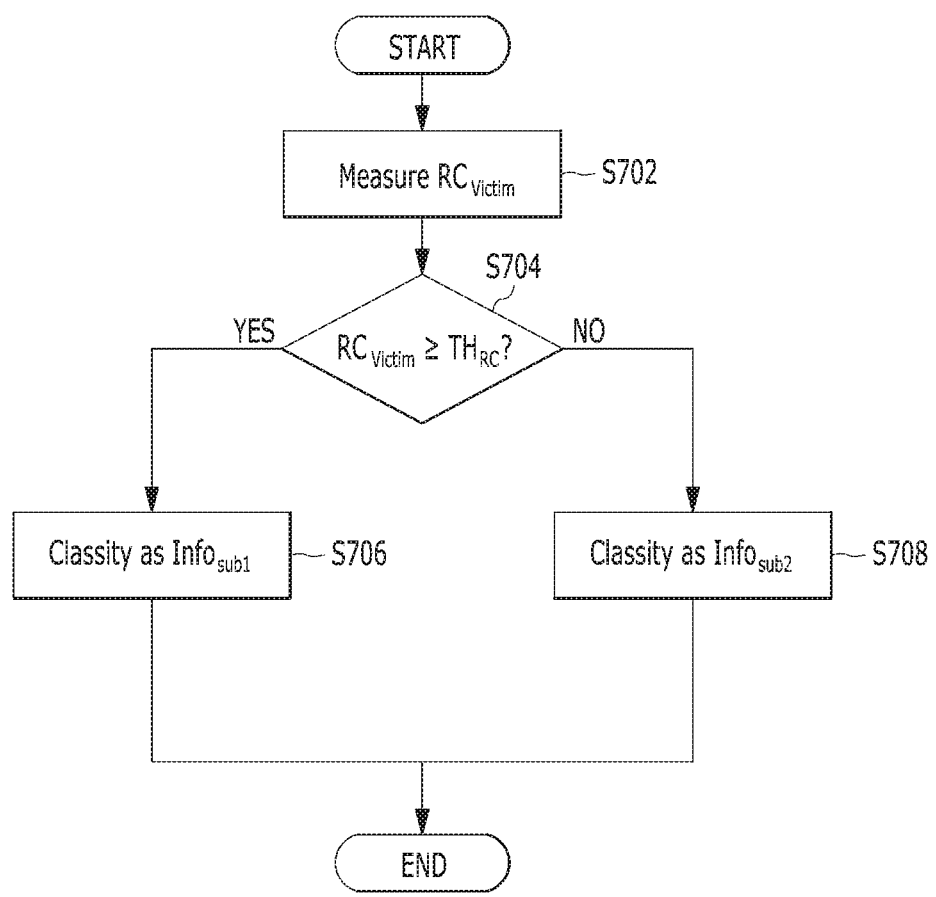
FIG. 7 is a flowchart describing a process of operating the sudden power-off manager in accordance with an embodiment of the present invention.

FIG. 7 is a flowchart describing a process of operating the sudden power-off manager 602 in accordance with an embodiment of the present invention.

In step S702, the sudden power-off manager 602 of the queue manager 504 may measure the read count of a victim block $\text{RC}_{victim}$ based on the garbage collection information $\text{info}_{GC}$ stored in the memory 144.

In step S704, the power-off manager 602 may compare the read count $\text{RC}_{victim}$ measured in the step S702 to a predetermined threshold value ($\text{TH}_{RC}$).

In step S706, when the measured read count of the victim block $\text{RC}_{victim}$ is equal to or greater than the predetermined threshold value $\text{TH}_{RC}$ ('YES' in the step S704), the sudden power-off manager 602 may classify the garbage collection information corresponding to the victim block as the first sub-group $\text{info}_{sub1}$.

In step S708, when the measured read count of the victim block $\text{RC}_{victim}$ is less than the predetermined threshold value $\text{TH}_{RC}$ ('NO' in the step S704), the sudden power-off manager 602 may classify the garbage collection information corresponding to the victim block as the second sub-group $\text{info}_{sub2}$.

FIG. 8 is a detailed block diagram of the victim block type manager 802 of the queue manager 504 shown in FIG. 5.

The victim block type manager 802 may include a data type management element 804 and a second classification element 806.

The data type management element 804 may detect whether the victim block is a map block or a data block based on the garbage collection information $\text{info}_{GC}$ stored in the memory 144. The data type management element 804 may provide the second classification element 806 with information $\text{info}_{VT}$ on the type of the victim block detected for each victim block.

The second classification element 806 may classify the garbage collection information $\text{info}_{GC}$ into the third and fourth sub-groups based on the provided type information $\text{info}_{VT}$ of the victim block. When the victim block is a map block, the second classification element 806 may classify the garbage collection information $\text{info}_{GC}$ corresponding to the victim block as the third sub-group. When the victim block is a data block, the second classification element 806 may classify the garbage collection information $\text{info}_{GC}$ corresponding to the victim block as the fourth sub-group. The second classification element 806 may provide the distributor 1202 (not shown) with the information $\text{info}_{sub3}$ and $\text{info}_{sub4}$ about the third and fourth sub-groups.

Figure 9:
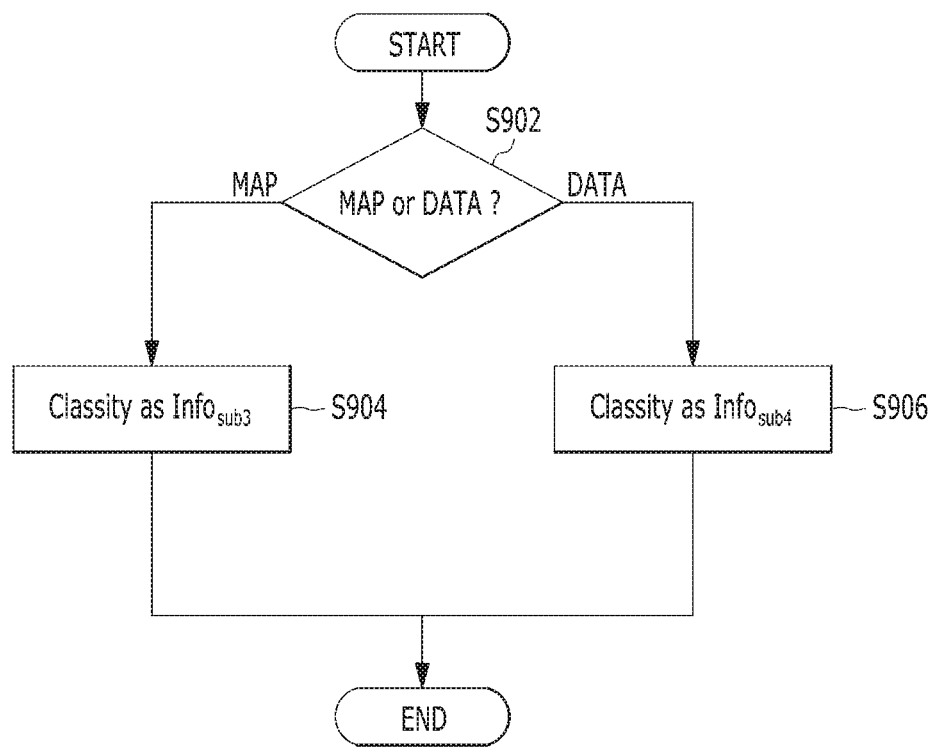
FIG. 9 is a flowchart describing a process of operating the victim block type manager in accordance with an embodiment of the present invention.

FIG. 9 is a flowchart describing a process of operating the victim block type manager 802 in accordance with an embodiment of the present invention.

In step S902, the victim block type manager 802 of the queue manager 504 may detect whether the victim block is a map block or a data block based on the garbage collection information $\text{info}_{GC}$ stored in the memory 144.

In step S904, when the victim block is a map block ('MAP' in the step S902), the victim block type manager 802 may classify the garbage collection information $\text{info}_{GC}$ corresponding to the victim block as the third sub-group $\text{Info}_{sub3}$.

In step S906, when the victim block is a data block ('DATA' in the step S902), the victim block type manager 802 may classify the garbage collection information $\text{info}_{GC}$ corresponding to the victim block as the fourth sub-group $\text{Info}_{sub4}$.

FIG. 10 is a detailed block diagram of the target block type manager 1002 of the queue manager 504 shown in FIG. 5.

The target block type manager 1002 may include an erase count management element 1004 and a third classification element 1006.

The erase count management element 1004 may measure the erase count of the victim block based on the garbage collection information $\text{info}_{GC}$ stored in the memory 144. The erase count management element 1004 may provide the third classification element 1006 with the garbage collection information $\text{info}_{GC}$ and the erase count information $\text{info}_{EC}$ measured for each victim block.

The third classification element 1006 may classify the garbage collection information $\text{info}_{GC}$ into the fifth and sixth sub-groups based on the provided erase count information $\text{info}_{EC}$. The third classification element 1006 may classify the garbage collection information $\text{info}_{GC}$ in which the erase count of a victim block is less than a predetermined threshold value among the garbage collection information $\text{info}_{GC}$ as the fifth sub-group. The third classification element 1006 may classify the garbage collection information $\text{info}_{GC}$ in which the erase count of a victim block is equal to or greater than the predetermined threshold value among the garbage collection information $\text{info}_{GC}$ as the sixth sub-group. The third classification element 1006 may provide the distributor 1202 (not shown) with the information $\text{info}_{sub5}$ and $\text{info}_{sub6}$ about the fifth and sixth sub-groups.

According to the embodiment of the present invention, the target block type manager 1002 may decide a valid data of a victim block whose erase count is less than the threshold value as a cold data. The target block type manager 1002 may classify the garbage collection information for a wear-leveling garbage collection operation separately by classifying the garbage collection information for the victim block storing the cold data as the fifth sub-group. The wear-leveling garbage collection operation may be an operation of copying the cold data of the victim block into a memory block whose erase count is equal to or greater than the threshold value. Therefore, the target block type manager 1002 may classify the garbage collection information for a target block whose erase count is equal to or greater than the threshold value as the fifth sub-group by classifying the garbage collection information for the wear-leveling garbage collection operation separately.

Figure 11:
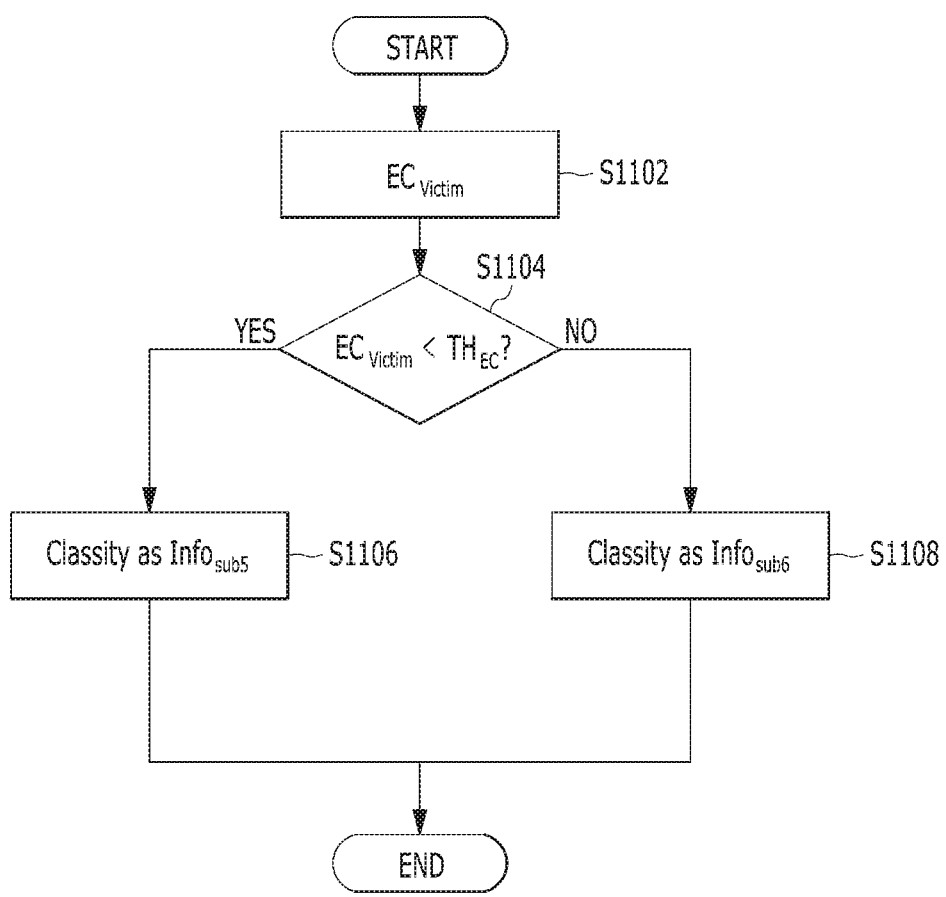
FIG. 11 is a flowchart describing a process of operating the target block type manager in accordance with an embodiment of the present invention.

FIG. 11 is a flowchart describing a process of operating the target block type manager 1002 in accordance with an embodiment of the present invention.

In step S1102, the target block type manager 1002 of the queue manager 504 may measure the erase count of the victim block $\text{info}_{EC}$ based on the garbage collection information $\text{info}_{GC}$ stored in the memory 144.

In step S1104, the target block type manager 1002 may compare the erase count $\text{info}_{EC}$ measured in the step S1102 to the predetermined threshold value ($\text{TH}_{EC}$).

In step S1106, when the erase count of the victim block is less than the predetermined threshold value $\text{TH}_{EC}$ ('YES' in the step S1104), the target block type manager 1002 may classify the garbage collection information corresponding to the victim block as the fifth sub-group $\text{Info}_{sub5}$.

In step S1108, when the measured erase count of the victim block is equal to or greater than the predetermined threshold value $\text{TH}_{EC}$ ('NO' in the step S1104), the target block type manager 1002 may classify the garbage collection information corresponding to the victim block as the sixth sub-group Info$_{sub6}$.

Figure 12:
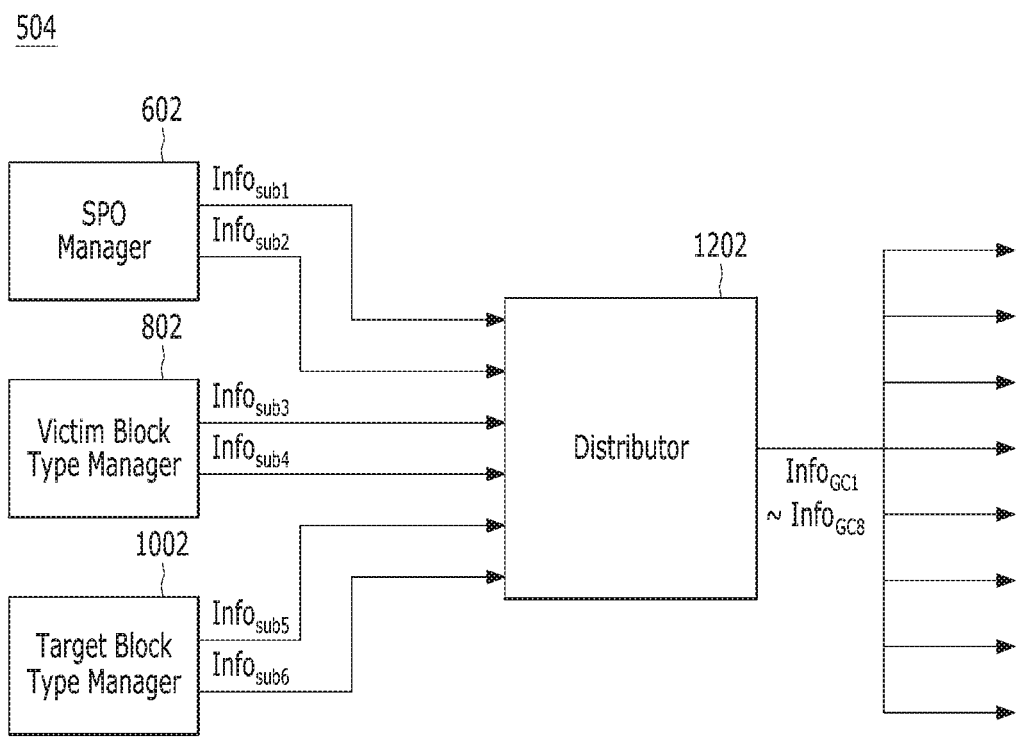
FIG. 12 is a detailed block diagram of a queue manager 504.

FIG. 12 is a detailed block diagram of the queue manager 504.

As described earlier with reference to FIG. 5, the queue manager 504 may include the sudden power-off manager 602, the victim block type manager 802, the target block type manager 1002, and the distributor 1202.

The distributor 1202 may classify garbage collection information into first to eighth groups by removing overlapping garbage collection information from the first to sixth sub-group information Info$_{sub1}$ to Info$_{sub6}$ provided from the sudden power-off manager 602, the victim block type manager 802, and the target block type manager 1002. For example, the distributor 1202 may classify the garbage collection information included in the first, third, and fifth sub-groups into a first group, classify the garbage collection information included in the second, third, and fifth sub-groups as a second sub-group, and classify the garbage collection information included in the second, fourth, and sixth sub-groups into an eighth sub-group.

The distributor 1202 may record attribute information of first to eighth garbage collection queues 215 to 285 included in the memory interface 142 into the memory 144. According to an embodiment of the present invention, the attribute information corresponding to the individual garbage collection queue may be of 3 bits. However, this is merely an example and the attribute information corresponding to the individual garbage collection queue may be different according to design. The distributor 1202 may record whether a recovery operation is performed after a sudden power-off, the type of a victim block, and the type of a target block in the most significant bit (MSB), the central significant bit (CSB), and the least significant bit (LSB).

The distributor 1202 may queue the garbage collection information info$_{GC1}$ to info$_{GC8}$ of the first to eighth groups to the corresponding garbage collection queues 215 to 285, respectively. According to an embodiment of the present invention, the distributor 1202 may record attribute information for each garbage collection queue without recording the attribute information for each garbage collection information so as to improve the utility efficiency of the memory space by classifying the garbage collection information according to the attribute and queuing the garbage collection information to corresponding garbage collection queues, respectively. Also, according to an embodiment of the present invention, since the garbage collection information of the same attribute are queued to the same queue, it is possible to shorten the time for searching the garbage collection information.

Referring back to FIG. 5, the garbage collection performer 506 may control the garbage collection operation of the memory device 150 based on the garbage collection information queued to the garbage collection queues 215 to 285. According to an embodiment of the present invention, when all the valid pages of the victim block are copied into a target block based on the garbage collection information, the garbage collection performer 506 may delete the garbage collection information from the garbage collection queue. When not all the valid pages of the victim block are copied into the target block during the garbage collection operation and the garbage collection performer 506 has to stop the garbage collection operation, the address of the valid page of the victim block where the garbage collection operation is performed may be recorded in a separate memory. The garbage collection performer 506 may resume the garbage collection operation from the valid page where the garbage collection operation is interrupted by referring to the address of the valid page of the victim block.

Hereinafter, the memory device in the memory system in accordance with the embodiment of the present invention will be described in more detail with reference to FIGS. 13 to 15.

Figure 13:
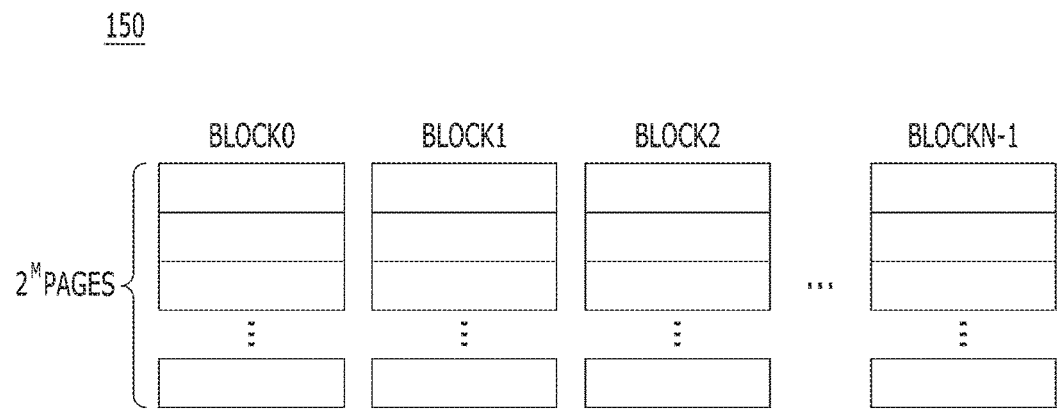
FIG. 13 is a schematic diagram illustrating a configuration of a memory device employed in the memory system shown in FIG. 3.

FIG. 13 is a schematic diagram illustrating the memory device 150. FIG. 14 is a circuit diagram illustrating a configuration of a memory cell array of a memory block 330 in the memory device 150. FIG. 15 is a schematic diagram illustrating a 3D structure of the memory device 150.

Referring to FIG. 13, the memory device 150 may include a plurality of memory blocks BLOCK0 to BLOCKN-1, where N is an integer greater than 1. Each of the blocks BLOCK0 to BLOCKN-1 may include a plurality of pages, for example, $2^M$ or M pages, the number of which may vary according to circuit design, M being an integer greater than 1. Each of the pages may include a plurality of memory cells that are coupled to a plurality of word lines WL.

Also, memory cells in the respective memory blocks BLOCK0 to BLOCKN-1 may be one or more of a single level cell (SLC) memory block storing 1-bit data or a multi-level cell (MLC) memory block storing 2-bit data. Hence, the memory device 150 may include SLC memory blocks or MLC memory blocks, depending on the number of bits which can be expressed or stored in each of the memory cells in the memory blocks. The SLC memory blocks may include a plurality of pages which are embodied by memory cells, each storing one-bit data. The SLC memory blocks may generally have higher data computing performance and higher durability than the MLC memory blocks. The MLC memory blocks may include a plurality of pages which are embodied by memory cells each storing multi-bit data (for example, 2 or more bits). The MLC memory blocks may generally have larger data storage space, that is, higher integration density, than the SLC memory blocks. In another embodiment, the memory device 150 may include a plurality of triple level cell (TLC) memory blocks. In yet another embodiment, the memory device 150 may include a plurality of quadruple level cell (QLC) memory blocks. The TCL memory blocks may include a plurality of pages which are embodied by memory cells each capable of storing 3-bit data. The QLC memory blocks may include a plurality of pages which are embodied by memory cells each capable of storing 4-bit data.

The memory device 150 is not limited to just nonvolatile memory. By way of example and not limitation, the memory device 150 may be implemented by any one of a phase change random access memory (PCRAM), a resistive random access memory (ReRAM, a ferroelectrics random access memory (FeRAM), and a spin transfer torque magnetic random access memory (STT-MRAM).

The memory blocks BLOCK0 to BLOCKN-1 may store the data transferred from the host 102 through a program operation, and may transfer data stored therein to the host 102 through a read operation.

Figure 14:
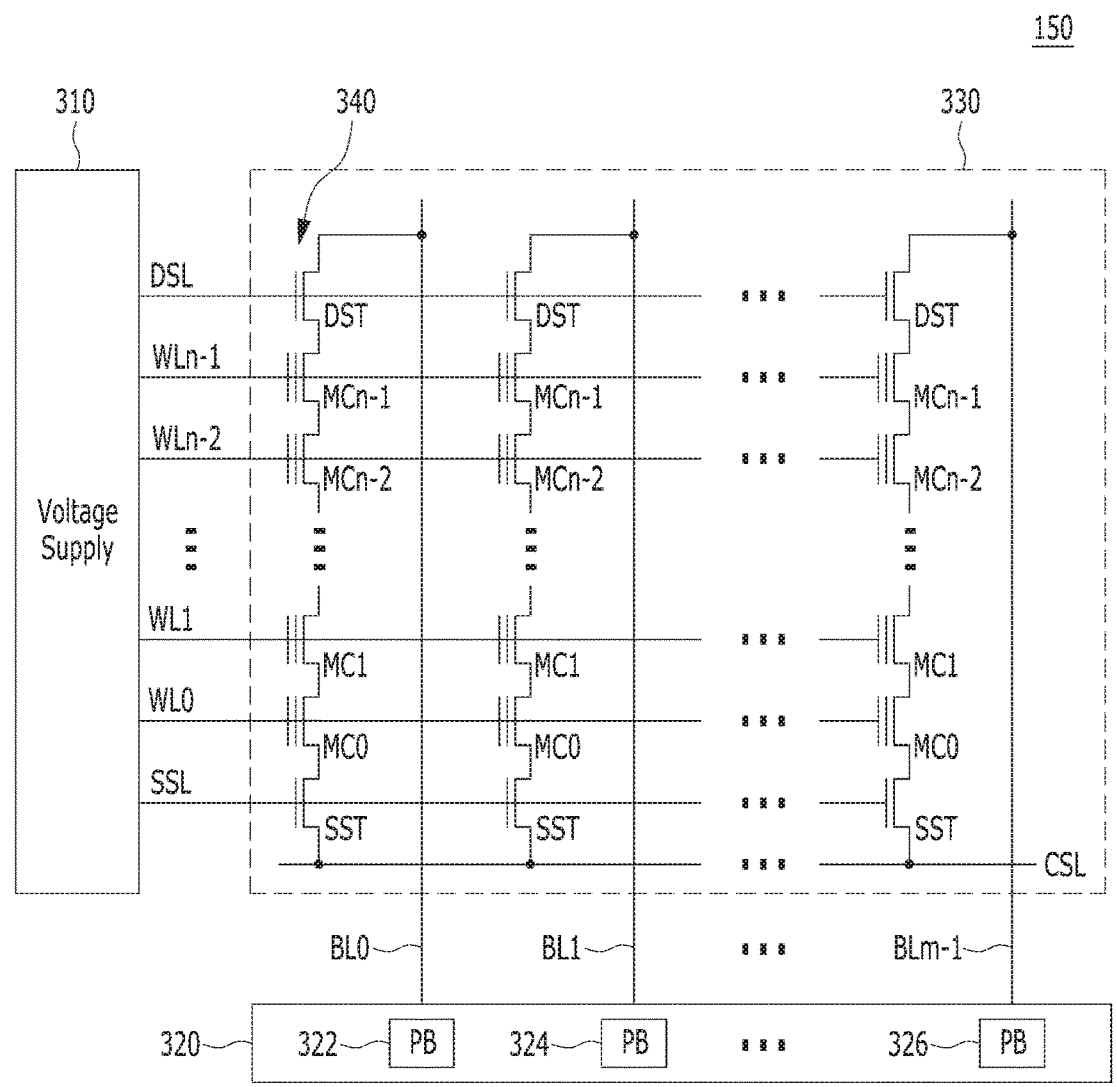
FIG. 14 is a circuit diagram illustrating a configuration of a memory cell array of a memory block in the memory device shown in FIG. 3.
Figure 15:
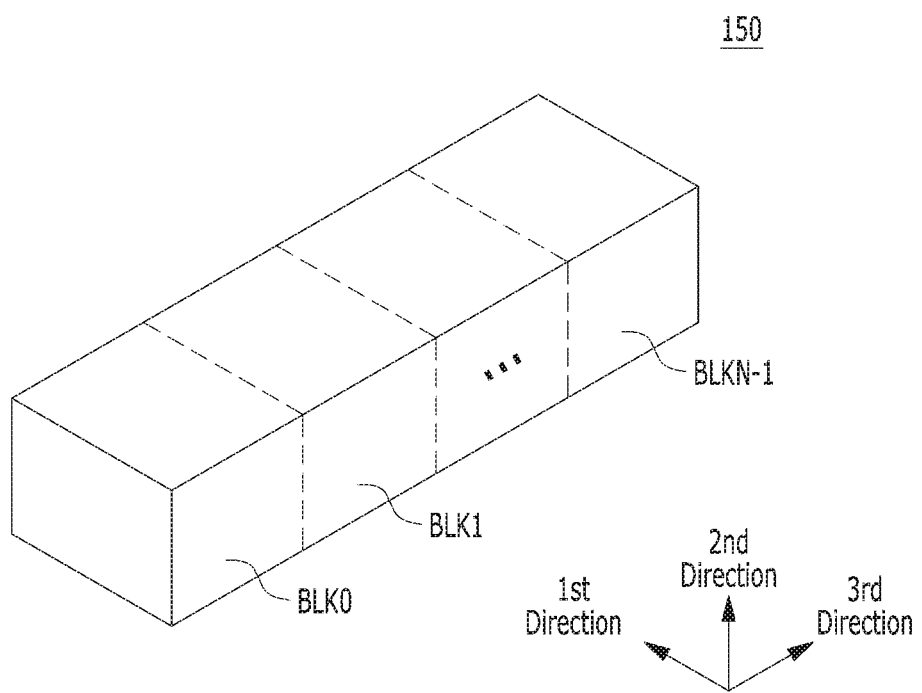
FIG. 15 is a block diagram illustrating a structure of a memory device of a memory system in accordance with an embodiment of the present invention.

Referring to FIG. 14, the memory block 330 may include a plurality of cell strings 340 coupled to a plurality of corresponding bit lines BL0 to BLm-1. The cell string 340 of each column may include one or more drain select transistors DST and one or more source select transistors SST. Between the drain and source select transistors DST and SST, a plurality of memory cells MC0 to MCn-1 may be coupled in series. In an embodiment, each of the memory cell transistors MC0 to MCn-1 may be embodied by an MLC capable of storing data information of a plurality of bits.

Each of the cell strings 340 may be electrically coupled to a corresponding bit line among the plurality of bit lines BL0 to BLm-1. For example, as illustrated in FIG. 3, the first cell string is coupled to the first bit line BL0, and the last cell string is coupled to the last bit line BLm-1.

Although FIG. 14 illustrates NAND flash memory cells, the present disclosure is not limited thereto. It is noted that the memory cells may be NOR flash memory cells, or hybrid flash memory cells including two or more kinds of memory cells combined therein. Also, it is noted that the memory device 150 may be a flash memory device including a conductive floating gate as a charge storage layer or a charge trap flash (CTF) memory device including an insulation layer as a charge storage layer.

The memory device 150 may further include a voltage supply 310 which generates different word line voltages including a program voltage, a read voltage, and a pass voltage to supply to the word lines according to an operation mode. The voltage generation operation of the voltage supply 310 may be controlled by a control circuit (not illustrated). Under the control of the control circuit, the voltage supply 310 may select at least one of the memory blocks (or sectors) of the memory cell array, select at least one of the word lines of the selected memory block, and provide the word line voltages to the selected word line(s) and the unselected word lines as may be needed.

The memory device 150 may include a read/write circuit 320 which is controlled by the control circuit. During a verification/normal read operation, the read/write circuit 320 may operate as a sense amplifier for reading (sensing and amplifying) data from the memory cell array. During a program operation, the read/write circuit 320 may operate as a write driver for supplying a voltage or a current to bit lines according to data to be stored in the memory cell array. During a program operation, the read/write circuit 320 may receive from a buffer (not illustrated) data to be stored into the memory cell array, and drive bit lines according to the received data. The read/write circuit 320 may include a plurality of page buffers 322 to 326 respectively corresponding to columns (or bit lines) or column pairs (or bit line pairs). Each of the page buffers 322 to 326 may include a plurality of latches (not illustrated).

The memory device 150 may be embodied by a 2D or 3D memory device. Particularly, as illustrated in FIG. 14, the memory device 150 may be embodied by a nonvolatile memory device having a 3D stack structure. When the memory device 150 has a 3D structure, the memory device 150 may include a plurality of memory blocks BLK0 to BLKN-1. Herein, FIG. 15 is a block diagram illustrating the memory blocks 152, 154 and 156 of the memory device 150 shown in FIG. 3. Each of the memory blocks 152, 154 and 156 may be realized in a 3D structure (or vertical structure). For example, the memory blocks 152, 154 and 156 may include structures of a 3D structure that are extended in first to third directions, e.g., an x-axis direction, a y-axis direction, and a z-axis direction.

Each memory block 330 included in the memory device 150 may include a plurality of NAND strings NS that are extended in the second direction, and a plurality of NAND strings NS that are extended in the first direction and the third direction (not shown). Herein, each of the NAND strings NS may be coupled to a bit line BL, at least one string selection line SSL, at least one ground selection line GSL, a plurality of word lines WL, at least one dummy word line DWL, and a common source line CSL, and each of the NAND strings NS may include a plurality of transistor structures TS.

In short, each memory block 330 among the memory blocks 152, 154 and 156 of the memory device 150 may be coupled to a plurality of bit lines BL, a plurality of string selection lines SSL, a plurality of ground selection lines GSL, a plurality of word lines WL, a plurality of dummy word lines DWL, and a plurality of common source lines CSL, and each memory block 330 may include a plurality of NAND strings NS. Also, in each memory block 330, one bit line BL may be coupled to a plurality of NAND strings NS to realize a plurality of transistors in one NAND string NS. Also, a string selection transistor SST of each NAND string NS may be coupled to a corresponding bit line BL, and a ground selection transistor GST of each NAND string NS may be coupled to a common source line CSL. Herein, memory cells MC may be provided between the string selection transistor SST and the ground selection transistor GST of each NAND string NS. In other words, a plurality of memory cells may be realized in each memory block 330 of the memory blocks 152, 154 and 156 of the memory device 150.

Hereafter, a data processing system and electronic devices to which the memory system 110 including the memory device 150 and the controller 130 described with reference to FIGS. 1 to 15 in accordance with the embodiment of the present invention is applied will be described in more detail by referring to FIGS. 16 to 24.

Figure 16:
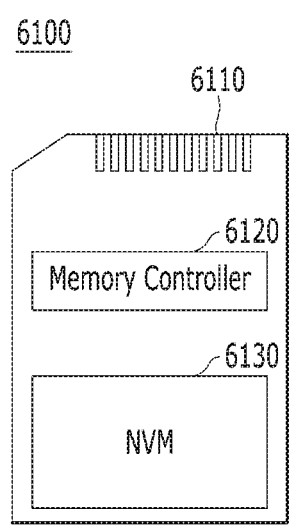
FIGS. 16 to 24 are diagrams schematically illustrating various application examples of the data processing system in accordance with various embodiments of the present invention.

FIG. 16 is a diagram schematically illustrating another example of the data processing system including the memory system in accordance with an embodiment. FIG. 16 schematically illustrates a memory card system to which the memory system may be applied.

Referring to FIG. 16, the memory card system 6100 may include a memory controller 6120, a memory device 6130 and a connector 6110.

More specifically, the memory controller 6120 may be electrically connected to, and configured to access, the memory device 6130 embodied by a nonvolatile memory. For example, the memory controller 6120 may control read, write, erase and background operations of the memory device 6130. The memory controller 6120 may provide an interface between the memory device 6130 and a host, and to use firmware for controlling the memory device 6130. That is, the memory controller 6120 may correspond to the controller 130 of the memory system 110 described with reference to FIG. 3, and the memory device 6130 may correspond to the memory device 150 of the memory system 110 described with reference to FIG. 3.

Thus, the memory controller 6120 may include a RAM, a processor, a host interface, a memory interface and an error correction component.

The memory controller 6120 may communicate with an external device, for example, the host 102 of FIG. 3 through the connector 6110. For example, as described with reference to FIG. 3, the memory controller 6120 may communicate with an external device through one or more of various communication protocols such as universal serial bus (USB), multimedia card (MMC), embedded MMC (eMMC), peripheral component interconnection (PCI), PCI express (PCIe), Advanced Technology Attachment (ATA), Serial-ATA, Parallel-ATA, small computer system interface (SCSI), enhanced small disk interface (EDSI), Integrated Drive Electronics (IDE), Firewire, universal flash storage (UFS), WIFI and Bluetooth. Thus, the memory system and the data processing system in accordance with the present embodiment may be applied to wired/wireless electronic devices or specific mobile electronic devices.

The memory device 6130 may be implemented by a nonvolatile memory. For example, the memory device 6130 may be implemented by any of various nonvolatile memory devices such as an erasable and programmable ROM (EPROM), an electrically erasable and programmable ROM (EEPROM), a NAND flash memory, a NOR flash memory, a phase-change RAM (PRAM), a resistive RAM (ReRAM), a ferroelectric RAM (FRAM) and a spin torque transfer magnetic RAM (STT-RAM).

The memory controller 6120 and the memory device 6130 may be integrated into a single semiconductor device to form a solid-state driver (SSD). Also, the memory controller 6120 and the memory device 6130 may be so integrated to form a memory card such as a PC card (PCMCIA: Personal Computer Memory Card International Association), a compact flash (CF) card, a smart media card (e.g., a SM and a SMC), a memory stick, a multimedia card (e.g., a MMC, a RS-MMC, a MMCmicro and an eMMC), an SD card (e.g., a SD, a miniSD, a microSD and a SDHC), and/or a universal flash storage (UFS).

Figure 17:
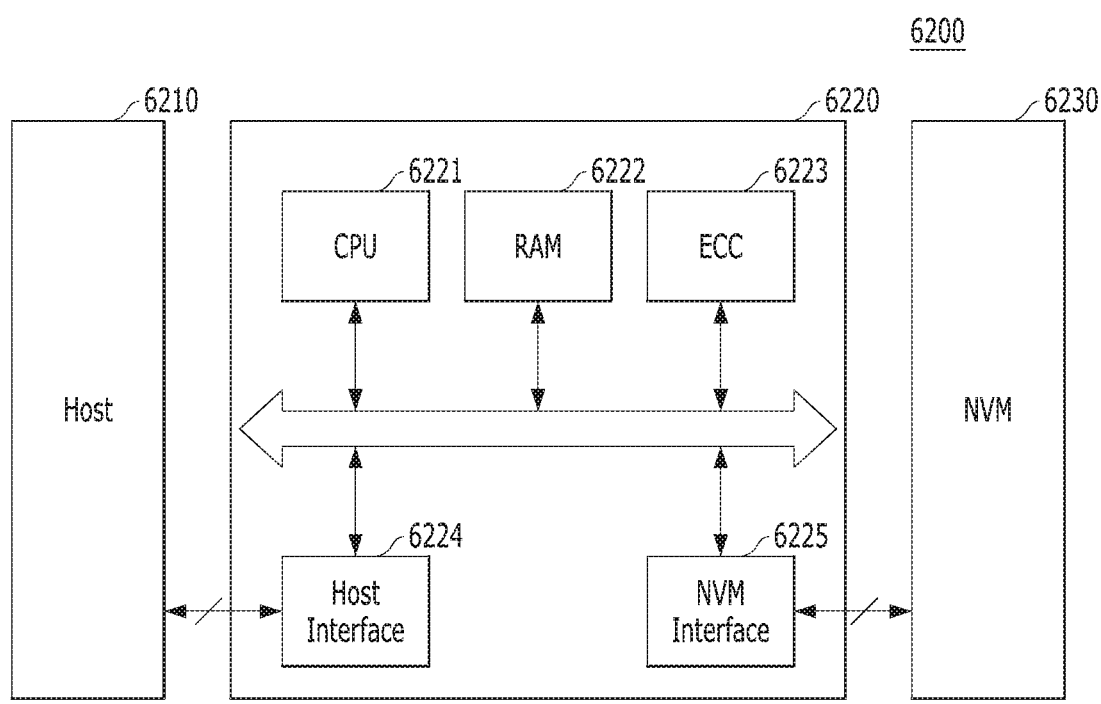

FIG. 17 is a diagram schematically illustrating another example of the data processing system including the memory system in accordance with an embodiment.

Referring to FIG. 17, the data processing system 6200 may include a memory device 6230 having one or more nonvolatile memories and a memory controller 6220 for controlling the memory device 6230. The data processing system 6200 illustrated in FIG. 17 may serve as a storage medium such as a memory card (CF, SD, micro-SD or the like) or USB device, as described with reference to FIG. 3. The memory device 6230 may correspond to the memory device 150 in the memory system 110 illustrated in FIG. 3, and the memory controller 6220 may correspond to the controller 130 in the memory system 110 illustrated in FIG. 3.

The memory controller 6220 may control a read, write or erase operation on the memory device 6230 in response to a request of the host 6210. The memory controller 6220 may include one or more CPUs 6221, a buffer memory such as RAM 6222, an ECC circuit 6223, a host interface 6224 and a memory interface such as an NVM interface 6225.

The CPU 6221 may control overall operations on the memory device 6230, for example, read, write, file system management and bad page management operations. The RAM 6222 may be operated according to control of the CPU 6221, and used as a work memory, buffer memory or cache memory. When the RAM 6222 is used as a work memory, data processed by the CPU 6221 may be temporarily stored in the RAM 6222. When the RAM 6222 is used as a buffer memory, the RAM 6222 may be used for buffering data transmitted to the memory device 6230 from the host 6210 or vice versa. When the RAM 6222 is used as a cache memory, the RAM 6222 may assist the low-speed memory device 6230 to operate at high speed.

The ECC circuit 6223 may generate an ECC (Error Correction Code) for correcting a failed bit or error bit of data provided from the memory device 6230. The ECC circuit 6223 may perform error correction encoding on data provided to the memory device 6230, thereby forming data with a parity bit. The parity bit may be stored in the memory device 6230. The ECC circuit 6223 may perform error correction decoding on data outputted from the memory device 6230. The ECC circuit 6223 may correct an error using the parity bit. The ECC circuit 6223 may correct an error using the LDPC code, BCH code, turbo code, Reed-Solomon code, convolution code, RSC or coded modulation such as TCM or BCM.

The memory controller 6220 may transmit/receive data to/from the host 6210 through the host interface 6224. The memory controller 6220 may transmit/receive data to/from the memory device 6230 through the NVM interface 6225. The host interface 6224 may be connected to the host 6210 through a PATA bus, a SATA bus, a SCSI, an USB, a PCIe or a NAND interface. The memory controller 6220 may have a wireless communication function with a mobile communication protocol such as WiFi or Long Term Evolution (LTE). The memory controller 6220 may be connected to an external device, for example, the host 6210 or another external device, and then transmit/receive data to/from the external device. In particular, as the memory controller 6220 may communicate with the external device according to one or more of various communication protocols, the memory system and the data processing system in accordance with an embodiment may be applied to wired/wireless electronic devices, particularly a mobile electronic device.

Figure 18:
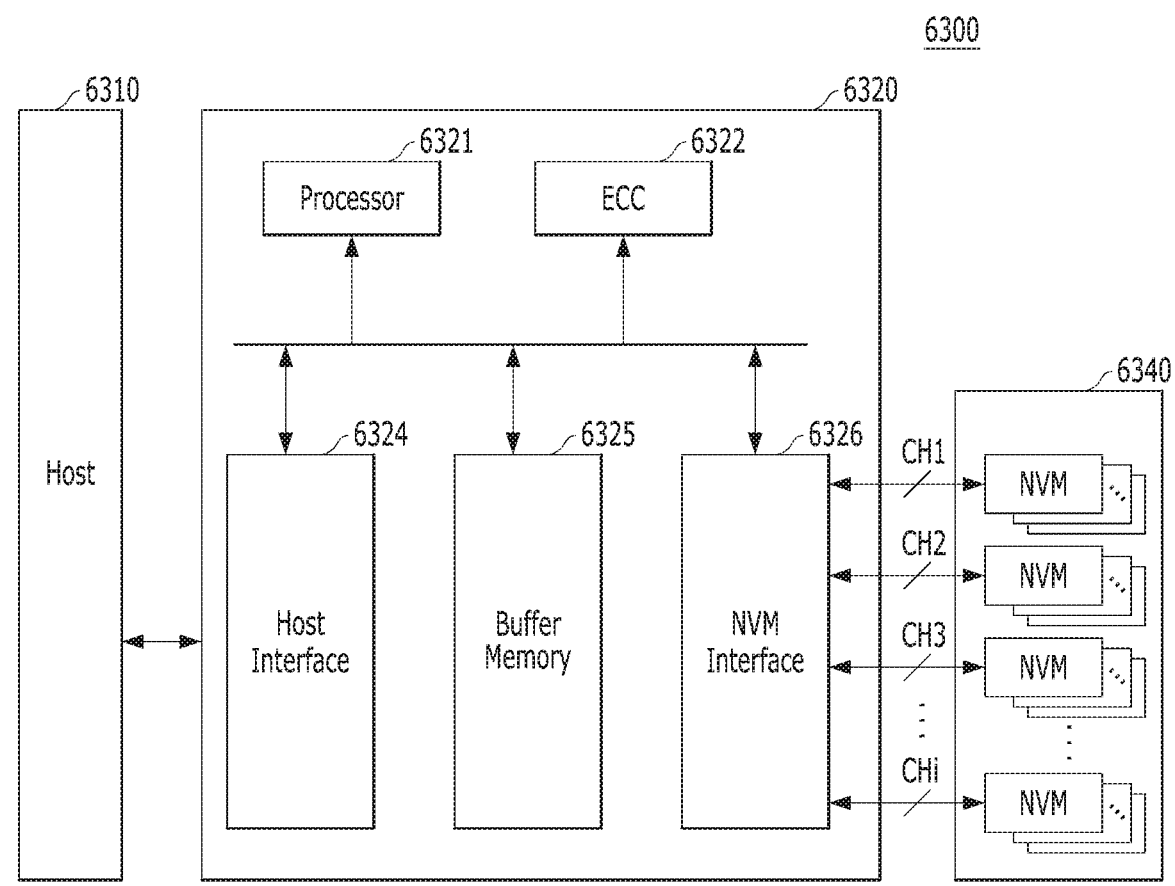

FIG. 18 is a diagram schematically illustrating another example of the data processing system including the memory system in accordance with an embodiment. FIG. 18 schematically illustrates an SSD to which the memory system may be applied.

Referring to FIG. 18, the SSD 6300 may include a controller 6320 and a memory device 6340 including a plurality of nonvolatile memories. The controller 6320 may correspond to the controller 130 in the memory system 110 of FIG. 3, and the memory device 6340 may correspond to the memory device 150 in the memory system of FIG. 3.

More specifically, the controller 6320 may be connected to the memory device 6340 through a plurality of channels CH1 to CHi. The controller 6320 may include one or more processors 6321, a buffer memory 6325, an ECC circuit 6322, a host interface 6324 and a memory interface, for example, a nonvolatile memory interface 6326.

The buffer memory 6325 may temporarily store data provided from the host 6310 or data provided from a plurality of flash memories NVM included in the memory device 6340. Further, the buffer memory 6325 may temporarily store meta data of the plurality of flash memories NVM, for example, map data including a mapping table. The buffer memory 6325 may be embodied by any of a variety of volatile memories such as a DRAM, a SDRAM, a DDR SDRAM, a LPDDR SDRAM and a GRAM or nonvolatile memories such as a FeRAM, a ReRAM, a STT-MRAM and a PCRAM. FIG. 18 illustrates that the buffer memory 6325 is embodied in the controller 6320. However, the buffer memory 6325 may be external to the controller 6320.

The ECC circuit 6322 may calculate an ECC value of data to be programmed to the memory device 6340 during a program operation, perform an error correction operation on data read from the memory device 6340 based on the ECC value during a read operation, and perform an error correction operation on data recovered from the memory device 6340 during a failed data recovery operation.

The host interface 6324 may provide an interface function with an external device, for example, the host 6310, and the nonvolatile memory interface 6326 may provide an interface function with the memory device 6340 connected through the plurality of channels.

Furthermore, a plurality of SSDs 6300 to which the memory system 110 of FIG. 3 may be applied may be provided to embody a data processing system, for example, a RAID (Redundant Array of Independent Disks) system. The RAID system may include the plurality of SSDs 6300 and a RAID controller for controlling the plurality of SSDs 6300. When the RAID controller performs a program operation in response to a write command provided from the host 6310, the RAID controller may select one or more memory systems or SSDs 6300 according to a plurality of RAID levels, that is, RAID level information of the write command provided from the host 6310 in the SSDs 6300, and output data corresponding to the write command to the selected SSDs 6300. Furthermore, when the RAID controller performs a read command in response to a read command provided from the host 6310, the RAID controller may select one or more memory systems or SSDs 6300 according to a plurality of RAID levels, that is, RAID level information of the read command provided from the host 6310 in the SSDs 6300, and provide data read from the selected SSDs 6300 to the host 6310.

Figure 19:
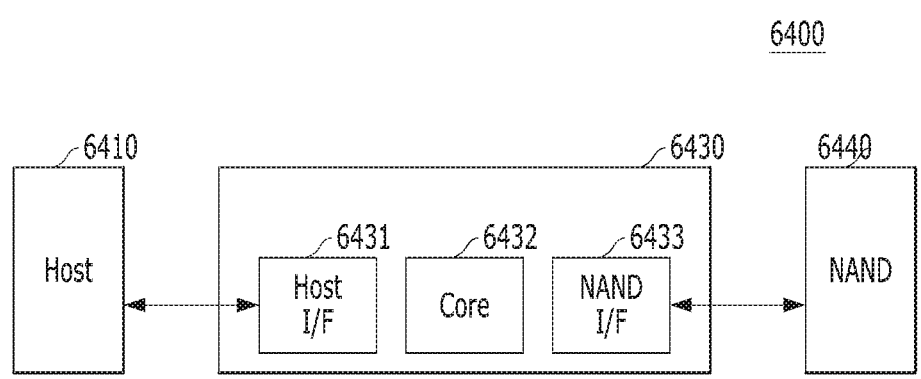

FIG. 19 is a diagram schematically illustrating another example of the data processing system including the memory system in accordance with an embodiment. FIG. 19 schematically illustrates an embedded Multi-Media Card (eMMC) to which the memory system may be applied.

Referring to FIG. 19, the eMMC 6400 may include a controller 6430 and a memory device 6440 embodied by one or more NAND flash memories. The controller 6430 may correspond to the controller 130 in the memory system 110 of FIG. 3. The memory device 6440 may correspond to the memory device 150 in the memory system 110 of FIG. 3.

More specifically, the controller 6430 may be connected to the memory device 6440 through a plurality of channels. The controller 6430 may include one or more cores 6432, a host interface 6431 and a memory interface, for example, a NAND interface 6433.

The core 6432 may control overall operations of the eMMC 6400, the host interface 6431 may provide an interface function between the controller 6430 and the host 6410, and the NAND interface 6433 may provide an interface function between the memory device 6440 and the controller 6430. For example, the host interface 6431 may serve as a parallel interface, for example, MMC interface as described with reference to FIG. 3. Furthermore, the host interface 6431 may serve as a serial interface, for example, UHS ((Ultra High Speed)-I/UHS-II) interface.

FIGS. 20 to 23 are diagrams schematically illustrating other examples of the data processing system including the memory system in accordance with embodiments. FIGS. 20 to 23 schematically illustrate UFS (Universal Flash Storage) systems to which the memory system may be applied.

Referring to FIGS. 20 to 23, the UFS systems 6500, 6600, 6700, 6800 may include hosts 6510, 6610, 6710, 6810, UFS devices 6520, 6620, 6720, 6820 and UFS cards 6530, 6630, 6730, 6830, respectively. The hosts 6510, 6610, 6710, 6810 may serve as application processors of wired/wireless electronic devices or particularly mobile electronic devices, the UFS devices 6520, 6620, 6720, 6820 may serve as embedded UFS devices, and the UFS cards 6530, 6630, 6730, 6830 may serve as external embedded UFS devices or removable UFS cards.

The hosts 6510, 6610, 6710, 6810, the UFS devices 6520, 6620, 6720, 6820 and the UFS cards 6530, 6630, 6730, 6830 in the respective UFS systems 6500, 6600, 6700, 6800 may communicate with external devices, for example, wired/wireless electronic devices or particularly mobile electronic devices through UFS protocols, and the UFS devices 6520, 6620, 6720, 6820 and the UFS cards 6530, 6630, 6730, 6830 may be embodied by the memory system 110 illustrated in FIG. 3. For example, in the UFS systems 6500, 6600, 6700, 6800, the UFS devices 6520, 6620, 6720, 6820 may be embodied in the form of the data processing system 6200, the SSD 6300 or the eMMC 6400 described with reference to FIGS. 17 to 19, and the UFS cards 6530, 6630, 6730, 6830 may be embodied in the form of the memory card system 6100 described with reference to FIG. 16.

Furthermore, in the UFS systems 6500, 6600, 6700, 6800, the hosts 6510, 6610, 6710, 6810, the UFS devices 6520, 6620, 6720, 6820 and the UFS cards 6530, 6630, 6730, 6830 may communicate with each other through an UFS interface, for example, MIPI M-PHY and MIPI UniPro (Unified Protocol) in MIPI (Mobile Industry Processor Interface). Furthermore, the UFS devices 6520, 6620, 6720, 6820 and the UFS cards 6530, 6630, 6730, 6830 may communicate with each other through any of various protocols other than the UFS protocol, for example, an UFDs, a MMC, a SD, a mini-SD, and a micro-SD.

Figure 20:
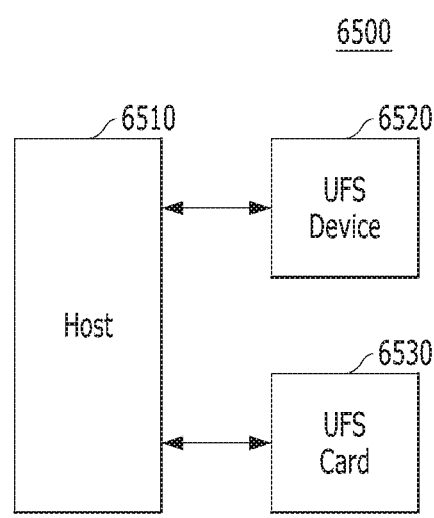

In the UFS system 6500 illustrated in FIG. 20, each of the host 6510, the UFS device 6520 and the UFS card 6530 may include UniPro. The host 6510 may perform a switching operation to communicate with the UFS device 6520 and the UFS card 6530. In particular, the host 6510 may communicate with the UFS device 6520 or the UFS card 6530 through link layer switching, for example, L3 switching at the UniPro. The UFS device 6520 and the UFS card 6530 may communicate with each other through link layer switching at the UniPro of the host 6510. In the illustrated embodiment, one UFS device 6520 and one UFS card 6530 are connected to the host 6510. However, a plurality of UFS devices and UFS cards may be connected in parallel or in the form of a star to the host 6410. A star formation is an arrangement in which a single device is coupled with plural devices for centralized operation. A plurality of UFS cards may be connected in parallel or in the form of a star to the UFS device 6520 or connected in series or in the form of a chain to the UFS device 6520.

Figure 21:
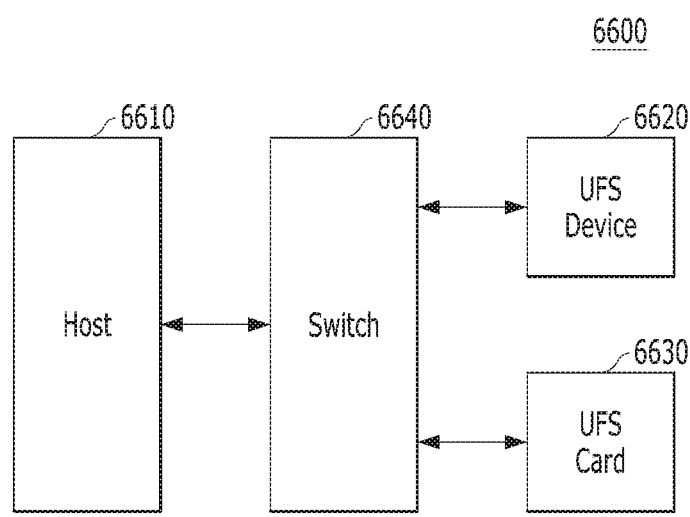

In the UFS system 6600 illustrated in FIG. 21, each of the host 6610, the UFS device 6620 and the UFS card 6630 may include UniPro. The host 6610 may communicate with the UFS device 6620 or the UFS card 6630 through a switching module 6640 performing a switching operation, for example, through the switching module 6640 which performs link layer switching at the UniPro, for example, L3 switching. The UFS device 6620 and the UFS card 6630 may communicate with each other through link layer switching of the switching module 6640 at UniPro. In the illustrated embodiment, one UFS device 6620 and one UFS card 6630 are connected to the switching module 6640. However, a plurality of UFS devices and UFS cards may be connected in parallel or in the form of a star to the switching module 6640. A plurality of UFS cards may be connected in series or in the form of a chain to the UFS device 6620.

Figure 22:
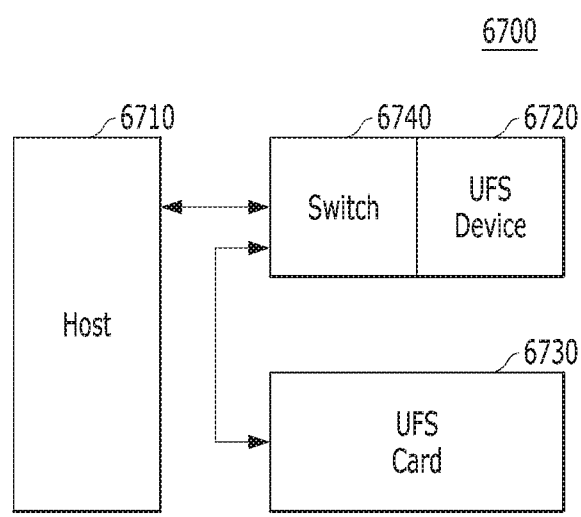

In the UFS system 6700 illustrated in FIG. 22, each of the host 6710, the UFS device 6720 and the UFS card 6730 may include UniPro. The host 6710 may communicate with the UFS device 6720 or the UFS card 6730 through a switching module 6740 performing a switching operation, for example, through the switching module 6740 which performs link layer switching at the UniPro, for example, L3 switching. The UFS device 6720 and the UFS card 6730 may communicate with each other through link layer switching of the switching module 6740 at the UniPro. The switching module 6740 may be integrated as one module with the UFS device 6720 inside or outside the UFS device 6720. In the illustrated embodiment, one UFS device 6720 and one UFS card 6730 are connected to the switching module 6740. However, a plurality of modules, each including the switching module 6740 and the UFS device 6720, may be connected in parallel or in the form of a star to the host 6710. In another example, a plurality of modules may be connected in series or in the form of a chain to each other. Furthermore, a plurality of UFS cards may be connected in parallel or in the form of a star to the UFS device 6720.

Figure 23:
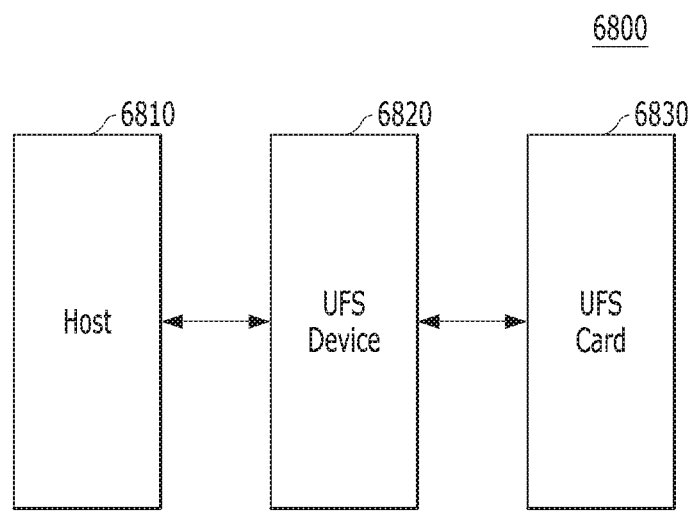

In the UFS system 6800 illustrated in FIG. 23, each of the host 6810, the UFS device 6820 and the UFS card 6830 may include M-PHY and UniPro. The UFS device 6820 may perform a switching operation to communicate with the host 6810 and the UFS card 6830. In particular, the UFS device 6820 may communicate with the host 6810 or the UFS card 6830 through a switching operation between the M-PHY and UniPro module for communication with the host 6810 and the M-PHY and UniPro module for communication with the UFS card 6830, for example, through a target ID (Identifier) switching operation. The host 6810 and the UFS card 6830 may communicate with each other through target ID switching between the M-PHY and UniPro modules of the UFS device 6820. In the illustrated embodiment, one UFS device 6820 is connected to the host 6810 and one UFS card 6830 is connected to the UFS device 6820. However, a plurality of UFS devices may be connected in parallel or in the form of a star to the host 6810, or connected in series or in the form of a chain to the host 6810. A plurality of UFS cards may be connected in parallel or in the form of a star to the UFS device 6820, or connected in series or in the form of a chain to the UFS device 6820.

Figure 24:
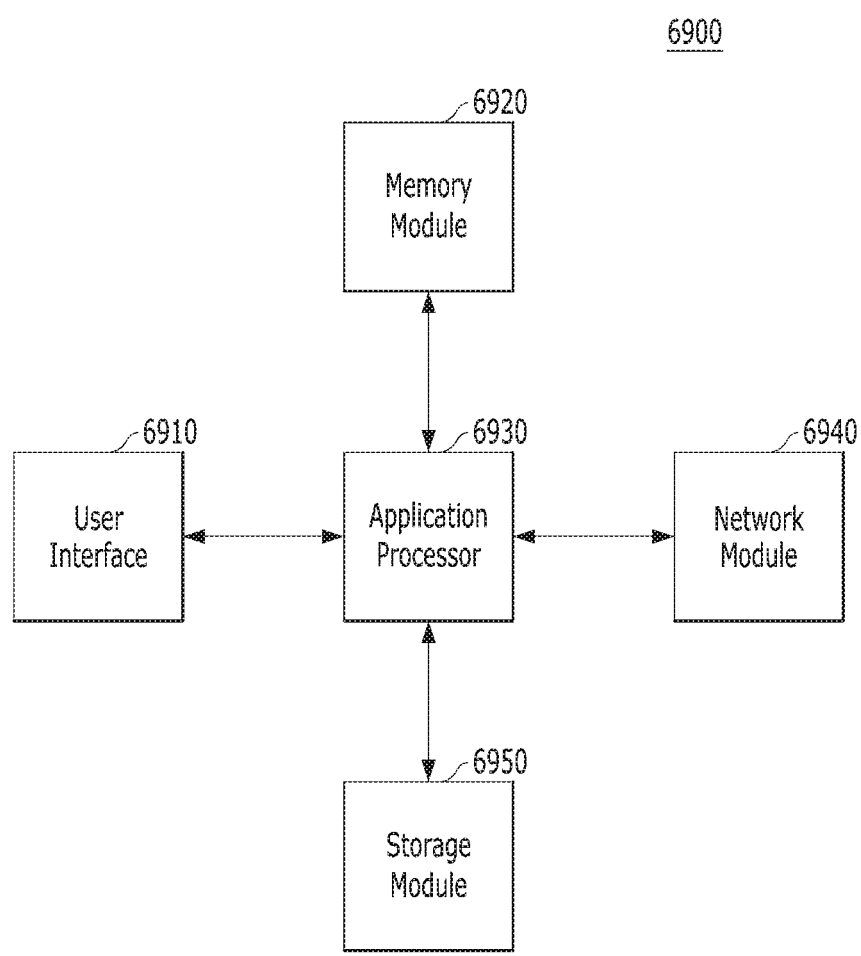

FIG. 24 is a diagram schematically illustrating another example of the data processing system including the memory system in accordance with an embodiment of the present invention. FIG. 24 is a diagram schematically illustrating a user system to which the memory system may be applied.

Referring to FIG. 24, the user system 6900 may include an application processor 6930, a memory module 6920, a network module 6940, a storage module 6950 and a user interface 6910.

More specifically, the application processor 6930 may drive components in the user system 6900, for example, an OS, and include controllers, interfaces and a graphic engine which control the components included in the user system 6900. The application processor 6930 may be provided as System-on-Chip (SoC).

The memory module 6920 may be used as a main memory, work memory, buffer memory or cache memory of the user system 6900. The memory module 6920 may include a volatile RAM such as a DRAM, a SDRAM, a DDR SDRAM, a DDR2 SDRAM, a DDR3 SDRAM, a LPDDR SDARM, a LPDDR3 SDRAM or a LPDDR3 SDRAM. The memory module 6920 may also include a nonvolatile RAM such as a PCRAM, a ReRAM, a MRAM or a FeRAM. For example, the application processor 6930 and the memory module 6920 may be packaged and mounted, based on POP (Package on Package).

The network module 6940 may communicate with external devices. For example, the network module 6940 may not only support wired communication, but also support various wireless communication protocols such as code division multiple access (CDMA), global system for mobile communication (GSM), wideband CDMA (WCDMA), CDMA-2000, time division multiple access (TDMA), long term evolution (LTE), worldwide interoperability for microwave access (Wimax), wireless local area network (WLAN), ultra-wideband (UWB), Bluetooth, wireless display (WI-DI), thereby communicating with wired/wireless electronic devices, particularly mobile electronic devices. Therefore, the memory system and the data processing system, in accordance with an embodiment of the present invention, can be applied to wired/wireless electronic devices. The network module 6940 may be included in the application processor 6930.

The storage module 6950 may store data, for example, data received from the application processor 6930, and then may transmit the stored data to the application processor 6930. The storage module 6950 may be embodied by a nonvolatile semiconductor memory device such as a phase-change RAM (PCRAM), a magnetic RAM (MRAM), a resistive RAM (ReRAM), a NAND flash, a NOR flash and a 3D NAND flash, and provided as a removable storage medium such as a memory card or external drive of the user system 6900. The storage module 6950 may correspond to the memory system 110 described with reference to FIG. 3. Furthermore, the storage module 6950 may be embodied as an SSD, an eMMC and an UFS as described above with reference to FIGS. 18 to 23.

The user interface 6910 may include interfaces for inputting data or commands to the application processor 6930 or outputting data to an external device. For example, the user interface 6910 may include user input interfaces such as a keyboard, a keypad, a button, a touch panel, a touch screen, a touch pad, a touch ball, a camera, a microphone, a gyroscope sensor, a vibration sensor and a piezoelectric element, and user output interfaces such as a liquid crystal display (LCD), an organic light emitting diode (OLED) display device, an active matrix OLED (AMOLED) display device, an LED, a speaker and a motor.

Furthermore, when the memory system 110 of FIG. 3 is applied to a mobile electronic device of the user system 6900, the application processor 6930 may control overall operations of the mobile electronic device, and the network module 6940 may serve as a communication module for controlling wired/wireless communication with an external device. The user interface 6910 may display data processed by the processor 6930 on a display/touch module of the mobile electronic device, or support a function of receiving data from the touch panel.

According to the embodiment of the present invention, the memory system may efficiently use the memory space and perform a garbage collection operation quickly by queuing garbage collection information to separate queues according to the attribute.

While the present invention has been described with respect to the specific embodiments, it will be apparent to those skilled in the art that various changes and modifications may be made without departing from the spirit and scope of the disclosure as defined in the following claims.

What is claimed is:
1. A memory system, comprising:
a memory device;
a memory;
a plurality of queues;
a victim block manager suitable for storing garbage collection information corresponding to a victim block in the memory;
a queue manager suitable for classifying the garbage collection information and the queues according to attribute and queuing the classified garbage collection information to the corresponding queues, respectively; and
a garbage collection performer suitable for controlling a garbage collection operation of the memory device based on the queued garbage collection information, wherein each one of the garbage collection information in each of the queues includes a plurality of bits corresponding to attribute information, and wherein the plurality of bits are the same in each of the queues, and comprise one bit representing whether or not a recovery operation is performed after a sudden power-off, one bit representing a type of the victim block and one bit representing a type of a target block.

2. The memory system of claim 1, wherein the queue manager stores the attribute information corresponding to each of the queues in the memory.

3. The memory system of claim 1, wherein when the operation of performing the garbage collection operation on a valid page of the victim block is stopped, the garbage collection performer stores address information of the valid page in the memory and resumes the garbage collection operation from the valid page whose address information is stored.

4. The memory system of claim 1, wherein the queue manager includes:

a sudden power-off manager suitable for classifying the garbage collection information into first and second sub-groups based on whether a recovery operation is required after a sudden power-off.

5. The memory system of claim 4, wherein the queue manager includes:

a victim block type manager suitable for classifying the garbage collection information into third and fourth sub-groups based on whether the victim block is a map block or a data block.

6. The memory system of claim 5, wherein the queue manager includes:

a target block type manager suitable for classifying the garbage collection information into fifth and sixth sub-groups based on whether a target block is a wear-leveling target block or not.

7. The memory system of claim 6, wherein the queue manager includes:

a distributor suitable for classifying the garbage collection information into first to eighth groups by removing redundant information from the garbage collection information classified by the sudden power-off manager, the victim block type manager, and the target block type manager.

8. The memory system of claim 4, wherein the sudden power-off manager classifies as the first sub-group garbage collection information corresponding to a victim block whose read count is equal to or greater than a predetermined threshold value.

9. The memory system of claim 5, wherein the victim block type manager classifies as the third sub-group garbage collection information corresponding to a victim block that is a map block.

10. The memory system of claim 6, wherein the target block type manager classifies as the fifth sub-group garbage collection information corresponding to a victim block whose erase count is less than a predetermined threshold value.

11. A method for operating a memory system, comprising:

storing garbage collection information corresponding to a victim block in a memory;

classifying the garbage collection information and a plurality of queues according to attribute and queuing the classified garbage collection information to the corresponding queues, respectively; and controlling a garbage collection operation of a memory device based on the queued garbage collection information, wherein each one of the garbage collection information in each of the queues includes a plurality of bits corresponding to attribute information, and wherein the plurality of bits are the same in each of the queues, and comprise one bit representing whether or not a recovery operation is performed after a sudden power-off, one bit representing a type of the victim block and one bit representing a type of a target block.

12. The method of claim 11, wherein in the classifying of the garbage collection information and the queues, the attribute information corresponding to each of the queues is stored in the memory.

13. The method of claim 11, wherein in the controlling of the garbage collection operation, when the operation of performing the garbage collection operation on a valid page of the victim block is stopped, address information of the valid page is stored in the memory and the garbage collection operation is resumed from the valid page whose address information is stored.

14. The method of claim 11, wherein the classifying of the garbage collection information and the queues includes:

a sudden power-off managing process, wherein the garbage collection information is classified into first and second sub-groups based on whether a recovery operation is required after a sudden power-off.

15. The method of claim 14, wherein the classifying of the garbage collection information and the queues includes:

a victim block type managing process, wherein the garbage collection information is classified into third and fourth sub-groups based on whether the victim block is a map block or a data block.

16. The method of claim 15, wherein the classifying of the garbage collection information and the queues includes:

a target block type managing process, wherein the garbage collection information is classified into fifth and sixth sub-groups based on whether a target block is a wear-leveling target block or not.

17. The method of claim 16, wherein the classifying of the garbage collection information and the queues includes:

a distributing process, wherein the garbage collection information is classified into first to eighth groups by removing redundant information from the garbage collection information classified through the sudden power-off managing process, the victim block type managing process, and the target block type managing process.

18. The method of claim 14, wherein in the sudden power-off managing process, the garbage collection information corresponding to a victim block whose read count is equal to or greater than a predetermined threshold value is classified as the first sub-group.

19. The method of claim 15, wherein in the victim block type managing process, the garbage collection information corresponding to a victim block that is a map block is classified as the third sub group.

20. The method of claim 16, wherein in the target block type managing process, the garbage collection information corresponding to a victim block whose erase count is less than a predetermined threshold value is classified as the fifth sub-group.

* * * * *